(12) United States Patent
Kimura

(10) Patent No.: US 10,404,174 B2
(45) Date of Patent: Sep. 3, 2019

(54) BOOSTER CONVERTER APPARATUS

(71) Applicant: Toyota Jidosha Kabushiki Kaisha, Toyota-shi, Aichi-ken (JP)

(72) Inventor: Masaharu Kimura, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/269,297

(22) Filed: Feb. 6, 2019

(65) Prior Publication Data

US 2019/0245444 A1 Aug. 8, 2019

(30) Foreign Application Priority Data

Feb. 8, 2018 (JP) ................................. 2018-020738

(51) Int. Cl.
*H02M 3/158* (2006.01)

(52) U.S. Cl.
CPC ....... *H02M 3/1584* (2013.01); *H02M 3/1582* (2013.01)

(58) Field of Classification Search
CPC ...... H02M 3/156; H02M 3/157; H02M 3/158; H02M 3/1584; H02M 2003/1586
See application file for complete search history.

(56) References Cited

U.S. PATENT DOCUMENTS

| 3,696,286 A | * | 10/1972 | Ule | ........................ | B64G 1/425 |
| | | | | | 136/291 |
| 8,125,203 B2 | * | 2/2012 | Ayukawa | ............ | H02M 1/4225 |
| | | | | | 323/222 |
| 8,519,685 B2 | * | 8/2013 | Chatroux | ............ | H02M 3/1584 |
| | | | | | 323/225 |
| 2015/0311821 A1 | | 10/2015 | Kondo et al. | | |
| 2017/0257038 A1 | | 9/2017 | Hasuka et al. | | |

FOREIGN PATENT DOCUMENTS

| JP | 2006-515146 A | 5/2006 |
| JP | 2015-208203 A | 11/2015 |
| JP | 2017-158372 A | 9/2017 |
| WO | 2004/070925 A2 | 8/2004 |

* cited by examiner

*Primary Examiner* — Gary L Laxton
(74) *Attorney, Agent, or Firm* — Dinsmore & Shohl LLP

(57) ABSTRACT

An electronic control unit provided in a boost converter apparatus switches a switching element of each of plural boost converters in accordance with each target timing. The electronic control unit stores a table in which a plurality of superimposition prohibition regions are defined. The electronic control unit sets the target timing for each of the plural boost converters in a manner not to be superimposed on any of the plurality of superimposition prohibition regions defined in the table, and updates the table by using a superimposition prohibition region based on the set target timing.

5 Claims, 31 Drawing Sheets

FIG. 8

| INDEX | 0 | 1 | 2 | 3 | 4 | 5 | 6 | 7 | 8 | 9 | 10 | 11 | ... | 110 | 111 | 112 |
|---|---|---|---|---|---|---|---|---|---|---|---|---|---|---|---|---|
| START TIME | 65465 | 65480 | 65495 | 65510 | 65520 | 9 | 29 | 44 | 59 | 74 | 84 | 109 | ... | 65195 | 65210 | 65220 |
| END TIME | 65475 | 65490 | 65505 | 65520 | 65530 | 19 | 39 | 54 | 69 | 84 | 109 | 119 | ... | 65205 | 65220 | 65230 |

| SUPER-IMPOSITION PROHIBITED REGION | 113 | 114 | 115 | 116 | 117 | 118 | 119 | 120 | 121 | 122 | 123 | 124 | 125 | 126 | 127 |
|---|---|---|---|---|---|---|---|---|---|---|---|---|---|---|---|
| START TIME | 65230 | 65245 | 65265 | 65270 | 65280 | 65295 | 65310 | 65320 | 65345 | 65365 | 65380 | 65395 | 65410 | 65420 | 65445 |
| END TIME | 65240 | 65255 | 65275 | 65280 | 65290 | 65305 | 65320 | 65330 | 65355 | 65375 | 65390 | 65405 | 65420 | 65430 | 65455 |

FIG. 9

PROHIBITION REGION TABLE

| INDEX | 0 | 1 | 2 | 3 | 4 | 5 | 6 | 7 | 8 | 9 | 10 | 11 | ... | 110 | 111 | 112 |
|---|---|---|---|---|---|---|---|---|---|---|---|---|---|---|---|---|
| SUPER-IMPOSITION PROHIBITED REGION START TIME | 65465 | 65480 | 65495 | 65510 | 65520 | 9 | 29 | 44 | 59 | 74 | 84 | 109 | ... | 65195 | 65210 | 65220 |
| SUPER-IMPOSITION PROHIBITED REGION END TIME | 65475 | 65490 | 65505 | 65520 | 65530 | 19 | 39 | 54 | 69 | 84 | 109 | 119 | ... | 65205 | 65220 | 65230 |

| 113 | 114 | 115 | 116 | 117 | 118 | 119 | 120 | 121 | 122 | 123 | 124 | 125 | 126 | 127 |
|---|---|---|---|---|---|---|---|---|---|---|---|---|---|---|
| 65230 | 65245 | 65265 | 65270 | 65280 | 65295 | 65310 | 65320 | 65345 | 65365 | 65380 | 65395 | 65410 | 65420 | 65445 |
| 65240 | 65255 | 65275 | 65280 | 65290 | 65305 | 65320 | 65330 | 65355 | 65375 | 65390 | 65405 | 65420 | 65430 | 65455 |

CONVERTED PROHIBITION REGION TABLE

| INDEX | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| SUPER-IMPOSITION PROHIBITED REGION RELATIVE START TIME | 15 | 25 | 35 | 50 | 65 | 75 | 85 | 100 | 115 | 125 | 150 | 170 | 185 | 200 |
| SUPER-IMPOSITION PROHIBITED REGION RELATIVE END TIME | 10 | 25 | 35 | 45 | 60 | 70 | 85 | 95 | 110 | 125 | 135 | 160 | 180 | 195 | 210 |

| 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|
| 215 | 225 | 250 | 270 | 285 | 300 | 315 | 325 | 350 | 370 | 385 | 400 | 415 | 425 | 450 |
| 225 | 235 | 260 | 280 | 295 | 310 | 325 | 335 | 360 | 380 | 395 | 410 | 425 | 435 | 460 |

| INDEX | 0 | 1 | 2 | 3 | 4 | 5 | 6 | 7 |
|---|---|---|---|---|---|---|---|---|
| REQUESTED TIME | 65335 | 65375 | 65435 | 65475 | 65535 | 39 | 99 | 139 |

ADDITIONAL SIGNAL TABLE

| INDEX | 0 | 1 | 2 | 3 | 4 | 5 | 6 | 7 |
|---|---|---|---|---|---|---|---|---|
| REQUESTED TIME | 65335 | 65375 | 65435 | 65475 | 65535 | 39 | 99 | 139 |

CONVERTED ADDITIONAL SIGNAL TABLE

| INDEX | 0 | 1 | 2 | 3 | 4 | 5 | 6 | 7 |
|---|---|---|---|---|---|---|---|---|
| RELATIVE REQUESTED TIME | 140 | 180 | 240 | 280 | 340 | 380 | 440 | 480 |

CASE WHERE drv2a[i2] ≤ tbl2_lwr[j4]

CASE WHERE drv2a[i2] > tbl2_lwr[j4]

CASE WHERE drv2a[i] < tbl2_c

CASE WHERE drv2a[i] ≥ tbl2_c

FIG. 15
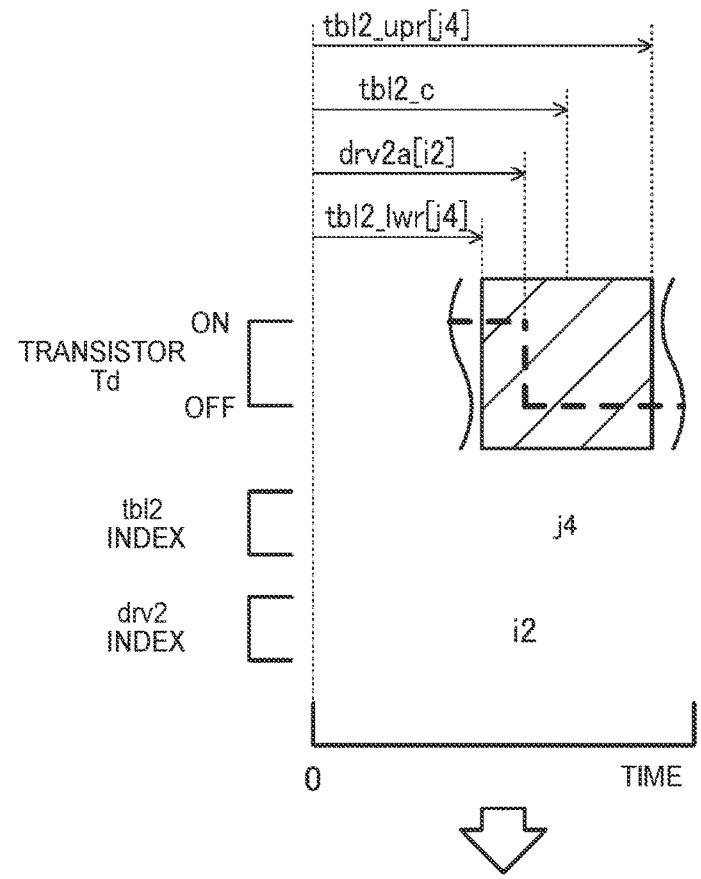
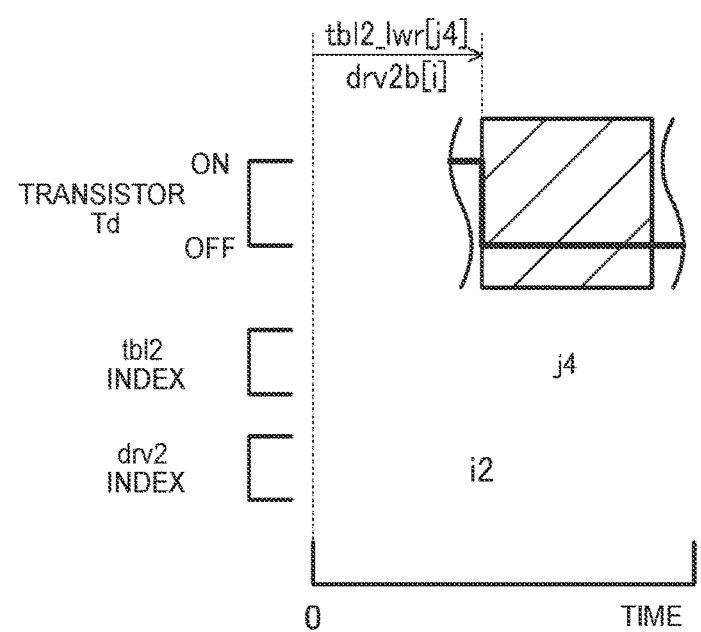

| INDEX | | 0 | ... | 29 |
|---|---|---|---|---|
| SUPER-IMPOSITION PROHIBITION REGION | RELATIVE START TIME | 0 | ... | 450 |
| | RELATIVE END TIME | 10 | ... | 460 |

| INDEX | | 0 | ... | 29 | 30 |
|---|---|---|---|---|---|
| SUPER-IMPOSITION PROHIBITION REGION | RELATIVE START TIME | 0 | ... | 450 | 470 |
| | RELATIVE END TIME | 10 | ... | 460 | 480 |

| INDEX | | 0 | ... | 29 |
|---|---|---|---|---|
| SUPER-IMPOSITION PROHIBITION REGION | RELATIVE START TIME | 0 | ... | 450 |
| | RELATIVE END TIME | 10 | ... | 460 |

| INDEX | | 0 | ... | 29 |
|---|---|---|---|---|
| SUPER-IMPOSITION PROHIBITION REGION | RELATIVE START TIME | 0 | ... | 450 |
| | RELATIVE END TIME | 10 | ... | 470 |

| INDEX | | 0 | ... | 10 | 11 | ... | 29 |
|---|---|---|---|---|---|---|---|
| SUPER-IMPOSITION PROHIBITION REGION | RELATIVE START TIME | 0 | ... | 125 | 150 | ... | 450 |
| | RELATIVE END TIME | 10 | ... | 135 | 160 | ... | 460 |

| INDEX | | 0 | ... | 10 | 11 | ... | 29 |
|---|---|---|---|---|---|---|---|
| SUPER-IMPOSITION PROHIBITION REGION | RELATIVE START TIME | 0 | ... | 125 | 150 | ... | 450 |
| | RELATIVE END TIME | 10 | ... | 140 | 160 | ... | 460 |

| INDEX | | 0 | ... | 10 | 11 | ... | 29 |
|---|---|---|---|---|---|---|---|
| SUPER-IMPOSITION PROHIBITION REGION | RELATIVE START TIME | 0 | ... | 125 | 150 | ... | 450 |
| | RELATIVE END TIME | 10 | ... | 135 | 160 | ... | 460 |

| INDEX | | 0 | ... | 10 | 11 | ... | 29 |
|---|---|---|---|---|---|---|---|
| SUPER-IMPOSITION PROHIBITION REGION | RELATIVE START TIME | 0 | ... | 125 | 145 | ... | 450 |
| | RELATIVE END TIME | 10 | ... | 135 | 160 | ... | 460 |

CONVERTED ADDITIONAL SIGNAL TABLE

| INDEX | 0 | 1 | 2 | 3 | 4 | 5 | 6 | 7 |
|---|---|---|---|---|---|---|---|---|
| RELATIVE TARGET TIME | 140 | 180 | 240 | 280 | 340 | 380 | 440 | 480 |

OUTPUT TABLE

| INDEX | ... | i4 | i4+1 | i4+2 | i4+3 | i4+4 | i4+5 | i4+6 | i4+7 | i4+8 |
|---|---|---|---|---|---|---|---|---|---|---|
| TARGET TIME | ... | 65295 | 65335 | 65375 | 65435 | 65475 | 65535 | 39 | 99 | 139 |

BOOSTER CONVERTER APPARATUS

CROSS-REFERENCE TO RELATED APPLICATION

This application claims priority to Japanese Patent Application No. 2018-020738 tiled on Feb. 8, 2018 incorporated herein by reference in its entirety.

BACKGROUND

1. Technical Field

The disclosure relates to a boost converter apparatus and, in particular, to a boost convertor apparatus including plurality of boost converters that are connected in parallel with each other to a power supply side and an electrical load side.

2. Description of Related Art

A boost converter apparatus includes a plurality of boost converters that are connected in parallel with each other between an input terminal and an output terminal, the input terminal receives an input voltage, and an output voltage to be supplied to a load circuit is output to the output terminal. As a boost converter apparatus of this type, a boost converter apparatus that drives the plurality of the boost converters by a plurality of drive signals at the same frequency has conventionally been proposed (for example, see Japanese Patent Application Publication No. 2017-158372 (JP 2017-158372 A)). In this boost converter apparatus, in the case where a second frequency is a multiple of a resonance frequency of a resonance circuit that is formed between the plurality of the boost converters and the load circuit when the frequencies of the plurality of the drive signals are switched from a first frequency to the second frequency, a phase difference between the plurality of the drive signals is set to a phase difference that avoids a resonance phenomenon. In this way, the resonance phenomenon of the resonance circuit is avoided.

SUMMARY

In the above-described boost converter apparatus, there is a case where switching timings of switching elements of the plurality of boost converters are superimposed. In the case where the switching timings are superimposed, it is concerned that a voltage surge of an output voltage is increased and exceeds a withstand voltage of the load circuit.

The disclosure provides a boost converter apparatus that includes a plurality of boost converters connected in parallel with each other between a power supply side and an electrical load side and that avoids switching timings of switching elements of the plurality of boost converters from being superimposed.

An aspect of the disclosure is a boost converter apparatus. The boost converter apparatus of the disclosure is a boost converter apparatus that includes: a plurality of boost converters connected in parallel with each other to a power supply side and an electrical load side, the plural boost converters being configured to boost a voltage of power on the power supply side by switching a switching element and to supply the power to the electrical load side; and an electronic control unit configured to switch the witching element of each of the plurality of boost converters in accordance with each target timing, the electronic control unit is configured to store a table in which a plurality of superimposition prohibition regions are defined, the electronic control unit being configured to set the target timing for each of the plurality of boost converters in a manner not to be superimposed on any of the plurality of superimposition prohibition regions defined in the table, and update the table by using a superimposition prohibition region based on the target timing.

With the above configuration, it is possible to avoid superimposition of the timing of switching of the switching element in each of the plurality of boost converters.

In the boost converter apparatus, the electronic control unit may be configured to set requested timing of switching of the switching element each of the plurality of boost converters, to set the requested timing as the target timing when the requested timing is superimposed on none of the plurality of superimposition prohibition regions defined in the table. The electronic control unit may be configured to set the target timing by putting the requested timing ahead or behind the superimposition prohibition region on which the requested timing is superimposed when the requested timing is superimposed on any of the plurality of superimposition prohibition regions defined in the table. With the above configuration, the target timing can be set in the manner not to be superimposed on the superimposition prohibition regions.

In the boost converter apparatus, the electronic control unit may be configured to set the target time to start time of the superimposition prohibition region on which the requested timing is superimposed when the requested timing is superimposed on a front-half portion of any of the plurality of superimposition prohibition regions defined in the table. The electronic control unit may be configured to set the target timing to end time of the superimposition prohibition region on which the requested timing is superimposed when the requested timing is superimposed on a latter-half portion of any of the plurality of superimposition prohibition regions defined in the table. With the above configuration, when the requested timing is superimposed on any of the plurality of superimposition prohibition regions defined in the table, a change amount from the requested timing to the target timing can be reduced.

In the boost converter apparatus, the superimposition prohibition region may be a region that has a specified period with the target timing being a center. With the above configuration, the superimposition prohibition region can further appropriately be defined.

In the boost converter apparatus, the electronic control unit may be configured to define the superimposition prohibition region based on the target timing in the table when the superimposition prohibition region based on the target timing is superimposed on none of the plurality of superimposition prohibition regions defined in the table. The electronic control unit may be configured to define new superimposition prohibition region in the table when the superimposition prohibition region based on the target timing is superimposed on any of the plurality of superimposition prohibition regions defined in the table. The new superimposition prohibition region may be a region that combines the superimposition prohibition region based on the target timing and the superimposition prohibition region on which the superimposition prohibition region based on the target timing is superimposed. With the above configuration, the superimposition prohibition region can further appropriately be defined.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 8 is an explanatory table of an example of the prohibition region table tbl;

FIG. 9 includes explanatory tables of creation processing off converted prohibition region table tbl2;

FIG. 15 includes explanatory graphs that show a state of processing in steps S360, S380;

DETAILED DESCRIPTION

Next, a description will be made on a mode for carrying out the disclosure by using an embodiment.

Figure 1:
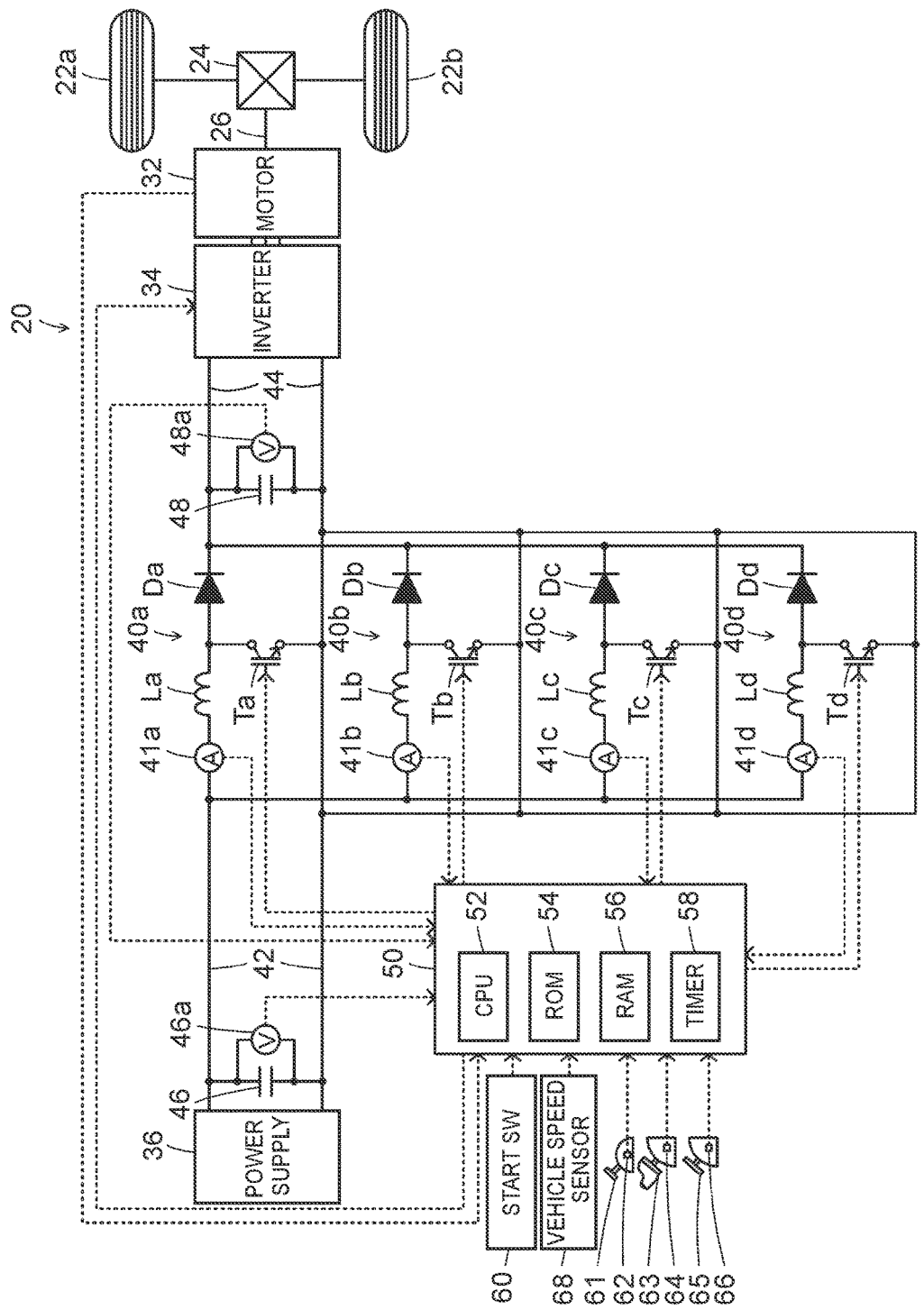
FIG. 1 is a configuration diagram schematically showing a configuration of an electric vehicle 20 that includes a boost converter apparatus as an embodiment of the disclosure.
Figure 2:
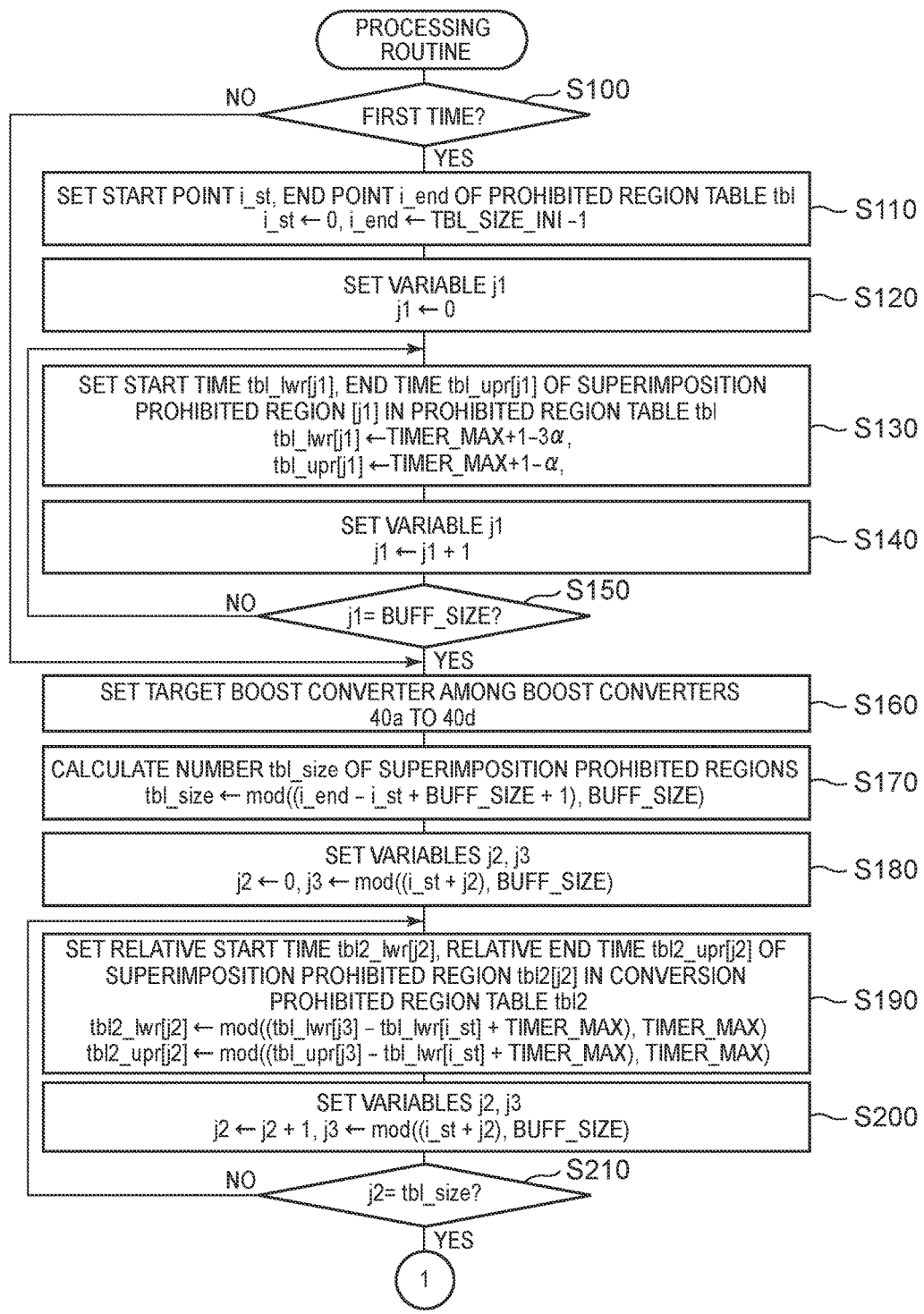
FIG. 2 is an explanatory view of an example of a processing routine that is executed by a CPU 52 of an electronic control unit 50.
Figure 3:
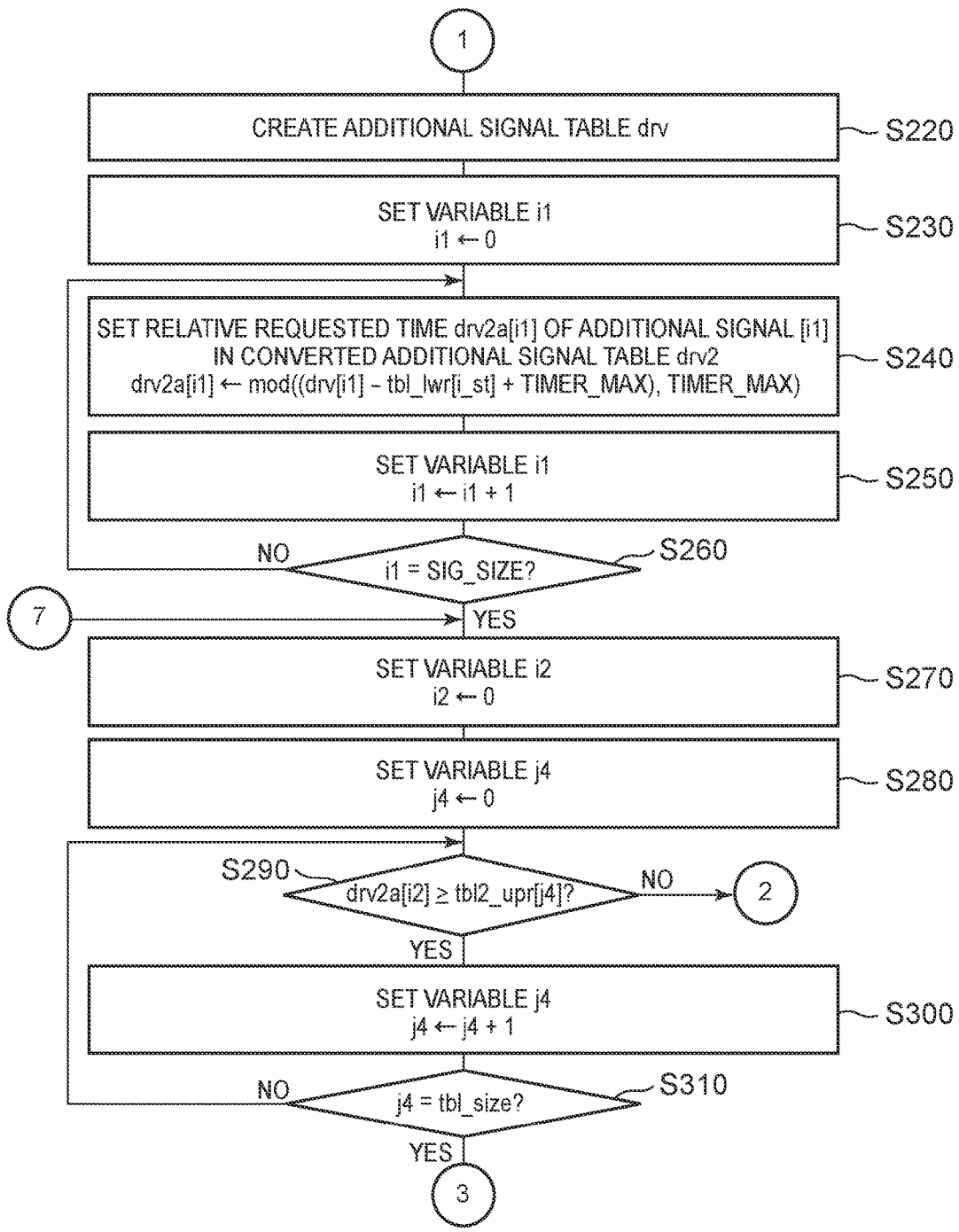
FIG. 3 is an explanatory view of the example of the processing routine that is executed by the CPU 52 of the electronic control unit 50.
Figure 4:
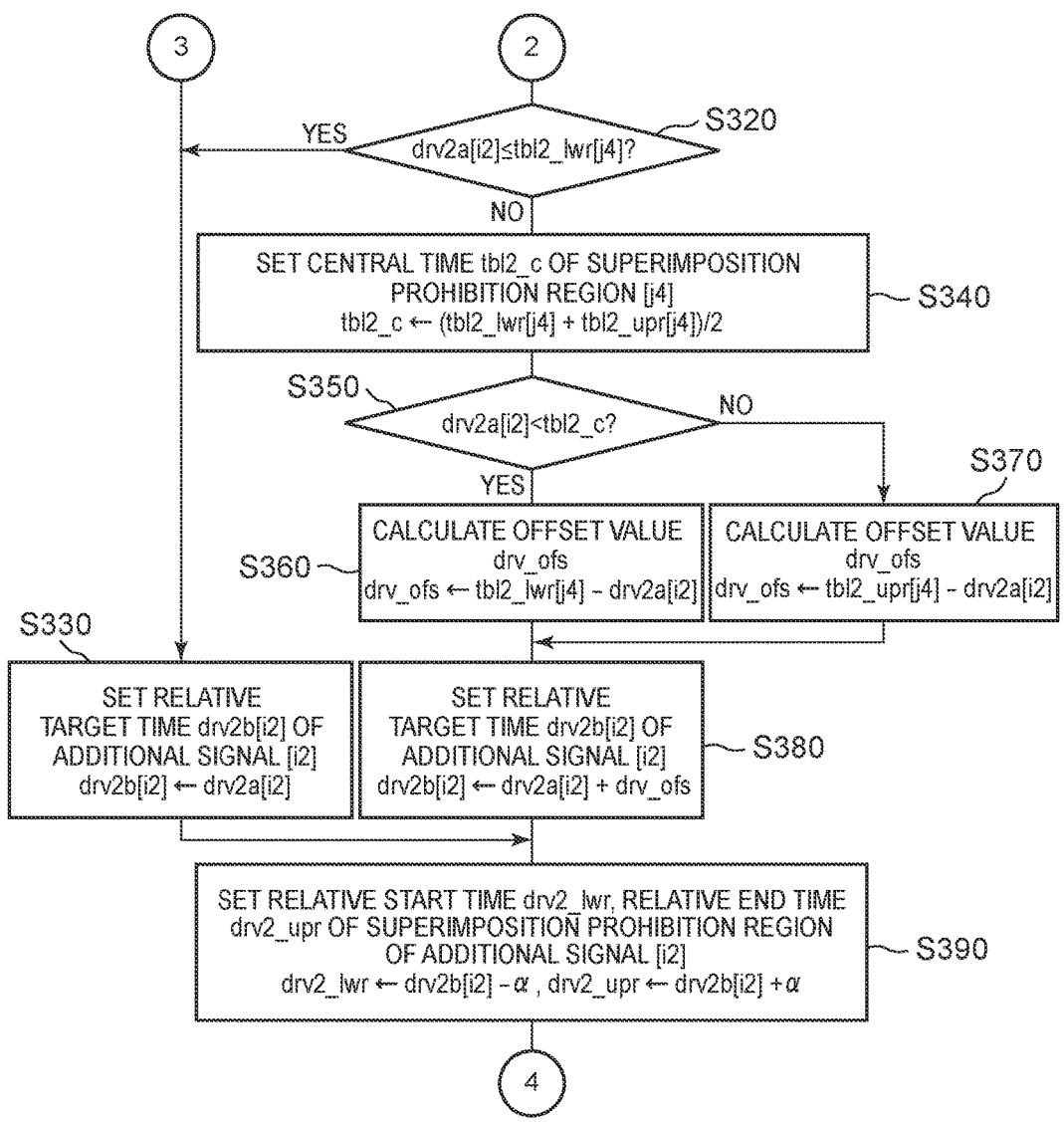
FIG. 4 is an explanatory view of the example of the processing routine that is executed by the CPU 52 of the electronic control unit 50.
Figure 5:
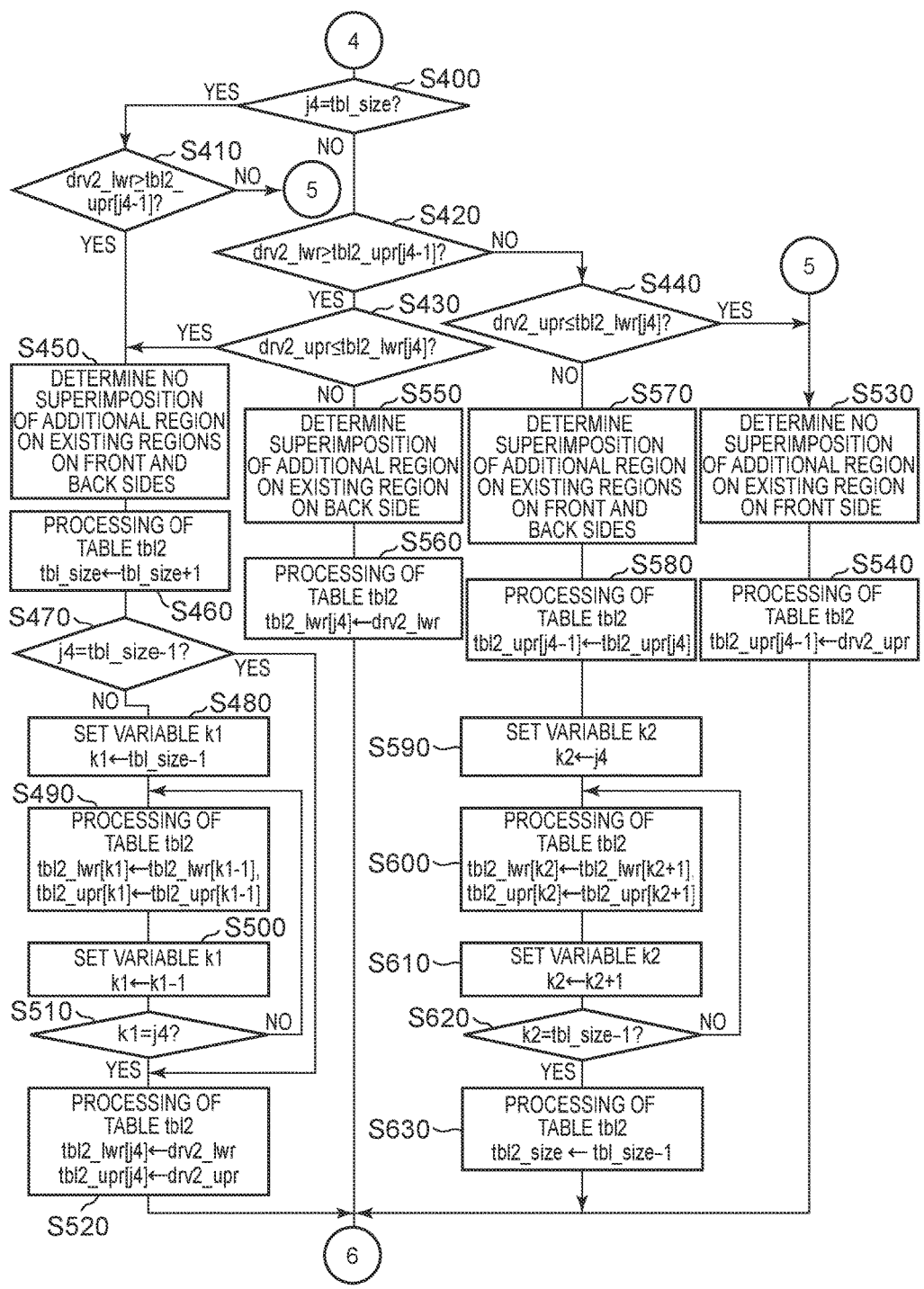
FIG. 5 is an explanatory view of the example of the processing routine that is executed by the CPU 52 of the electronic control unit 50.
Figure 6:
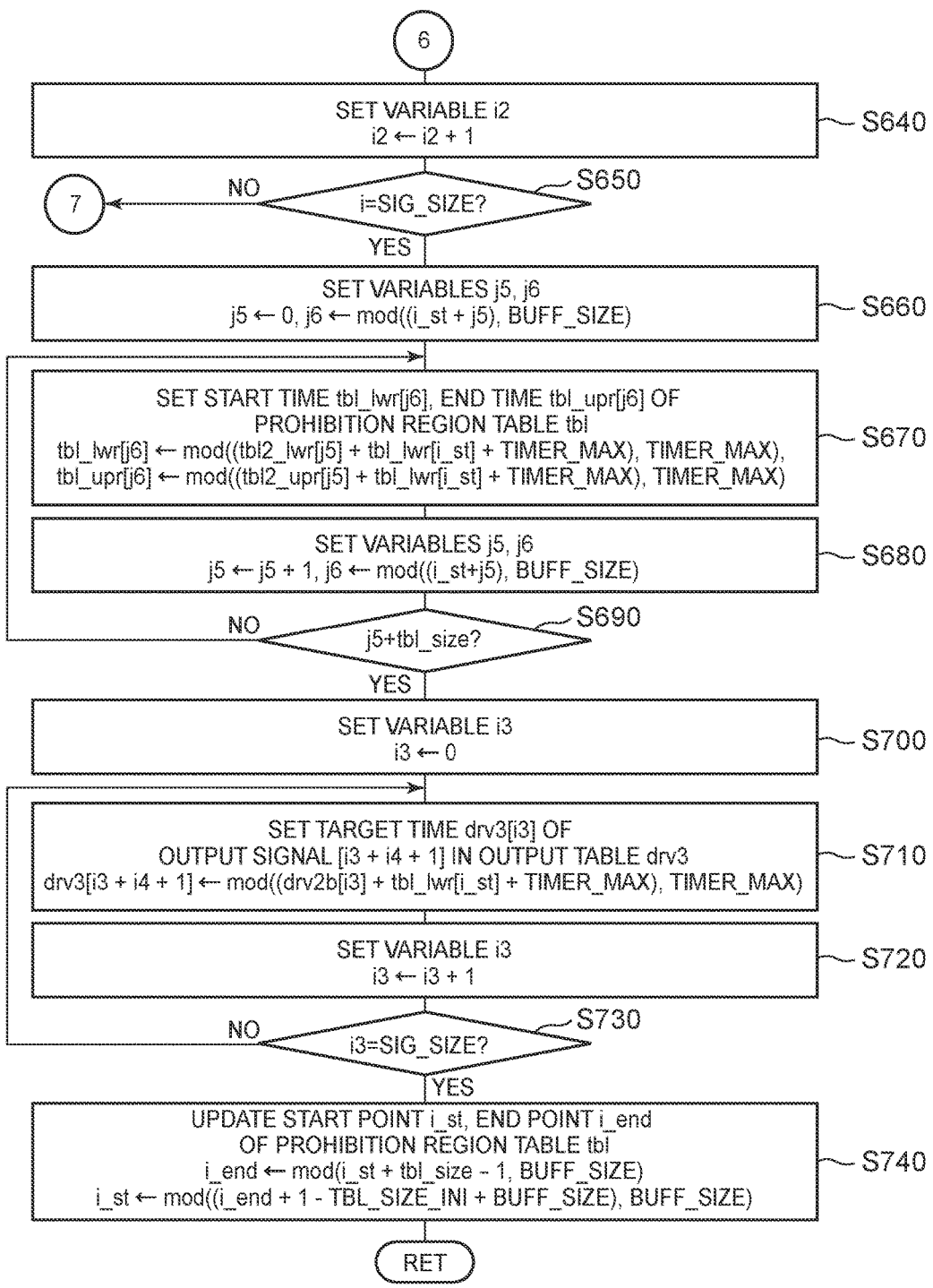
FIG. 6 is an explanatory view of the example old the processing routine that s executed by the CPU 52 of the electronic control unit 50.

FIG. 1 is a configuration diagram schematically showing a configuration of an electric vehicle 20 that includes a boost converter apparatus as an embodiment of the disclosure. As shown in FIG. 1, the electric vehicle 20 of the embodiment includes a motor 32, an inverter 34, a power supply 36, boost converters 40a to 40d, capacitors 46, 48, and an electronic control unit 50. Here, the boost converters 40a to 40d and the electronic control unit 50 correspond to the "boost converter apparatus" of the embodiment.

The motor 32 is configured as a synchronous generator-motor, for example, and is connected to a driveshaft 26 that is coupled to drive wheels 22a, 22b via a differential gear 24. The inverter 34 is used to drive the motor 32 and is connected to a high-voltage side power line 44. The motor 32 is rotationally driven when he electronic control unit 50 executes switching control on a plurality of switching elements (not shown) of the inverter 34. The power supply 36 is configured as a lithium-ion secondary battery, a nickel-metal hydride secondary battery, or a fuel battery, for example, and is connected to a low-voltage side power line 42. The capacitor 46 is connected to a positive-electrode side line and a negative-electrode side line of the low-voltage side power line 42. The capacitor 48 is connected to a positive-electrode side line and a negative-electrode side line of the high-voltage side power line 44.

The boost converters 40a to 40d are connected in parallel with each other to the low-voltage side power line 42 and the high-voltage side power line 44. These boost converters 40a to 40d include reactors La to Ld, diodes Da to Dd, and transistors Ta to Td as switching elements. One terminal of each of the reactors La to Ld is connected to the positive-electrode side line of the low-voltage side power line 42. The diodes Da to Dd are connected to the other terminals of the reactors La to Ld and the positive-electrode side line of the high-voltage side power line 44 in such a manner as to set a direction from the reactors La to Ld side to the positive-electrode side line side of the high-voltage side power line 44 as a forward direction. The transistors Ta to Td are connected to the other terminals of the reactors La to Ld and the negative-electrode side lines of the low-voltage side power line 42 and the high-voltage side power line 44. When the electronic control unit 50 regulates a ratio (a duty cycle) of ON periods to a sum of the ON periods and OFF periods of each of the transistors Ta to Td, these boost converters 40a to 40d boost power of the low-voltage side power line 42 and supply the boosted power to the high-voltage side power line 44.

The electronic control unit 50 is configured as a microprocessor having a CPU 52 as a central component and includes, in addition to the CPU 52, ROM 54 that stores processing programs, RAM 56 that temporarily stores data, a timer 58 that executes time count processing, and input/output ports. The electronic control unit 50 receives signals from various sensors via the input port. Examples of the signals received by the electronic control unit 50 are a rotational position θm from a rotational position detection sensor (not shown) that detects a rotational position of a rotor in the motor 32, a phase current from a current sensor (not shown) that detects a phase current of each phase of the motor 32, a voltage Vb of the power supply 36 from a voltage sensor (not shown) that is attached between terminals of the power supply 36, and a current Ib of the power supply 36 from a current sensor (not shown) that is attached to the output terminal of the power supply 36. In addition, examples of the signals received by the electronic control unit 50 are a voltage VL of the capacitor 46 (the low-voltage side power line 42) from a voltage sensor 46a that is attached between terminals of the capacitor 46, and a voltage VH of the capacitor 48 (the high-voltage side power line 44) from a voltage sensor 48a that is attached between terminals of the capacitor 48. Furthermore, examples of the signals received by the electronic control unit 50 are currents Ia to Id of the reactors La to Ld from current sensors 41a to 41d that are attached in series to the reactors La to Ld in the boost converters 40a to 40d. Moreover, examples of the signals received by the electronic control unit 50 are an ignition signal from a start switch 60, a shift position SP from a shift position sensor 62 that detects an operation position of a shift lever 61, an accelerator operation amount Acc from an accelerator pedal position sensor 64 that detects a depression amount of an accelerator pedal 63, a brake pedal position BP from a brake pedal position sensor 66 that detects a depression amount of a brake pedal 65, and a vehicle speed V from a vehicle speed sensor 68. The electronic control unit 50 outputs various control signals via the output port. Examples of the signals output from the electronic control unit 50 are a control signal output to each of the plurality of the switching elements in the inverter 34 and a control signal output to each of the transistors Ta to Td in the boost converters 40a to 40d. The electronic control unit 50 calculates a rotational speed Nm of the motor 32 on the basis of the rotational position θm of the rotor in the motor 32 from the rotational position detection sensor.

In the electric vehicle 20 of the embodiment that is configured as described above, the CPU 52 of the electronic control unit 50 sets requested torque Td* that is requested for travel (requested to the driveshaft 26) on the basis of the accelerator operation amount Acc and the vehicle speed V, and calculates requested power Pm* that is requested to the motor 32 for the travel by multiplying the set requested torque Td* by the rotational speed Nm of the motor 32. Next, the CPU 52 of the electronic control unit sets a torque command Tm* for the motor 32 such that the requested torque Td* (the requested power Pm*) is output to the driveshaft 26, and executes the switching control on the plurality of the switching elements in the inverter 34 such that, the motor 32 is driven in accordance with the torque command Tm*. In addition, the CPU 52 of the electronic control unit sets a target voltage VH* of the high-voltage side power line 44 such that the motor 32 can be driven in accordance with the torque command Tm*, sets target duty cycles Dta* to Dtd* of the boost converters 40a to 40d such that the power from the power supply 36 is boosted to the target voltage VH* and that the requested power Pm* is supplied to the motor 32, and executes the switching control on the transistors Ta to Td in the boost converters 40a to 40d on the basis of the set target duty cycles Dta* to Dtd*.

In the switching control of the transistors Ta to Td in the boost converters 40a to 40d, the CPU 52 of the electronic control unit 50 sets each target time (target timing) of switching of the transistors Ta to Td on the basis of the target duty cycles Dta* to Dtd*, and switches the transistors Ta to Td in accordance with the each target time.

Next, a description will be made on an operation of the boost converter apparatus that is mounted on the electric vehicle 20 of the embodiment configured as described above, in particular, on the operation of the boost converter apparatus at the time of setting the each target time (the each target timing) of switching of the transistors Ta to Td in the boost converters 40a to 40d. FIG. 2 to FIG. 6 are explanatory views of one example of a processing routine that is executed by the CPU 52 of the electronic control unit 50. This routine is repeatedly executed, in the embodiment, the each target time of switching of the transistors Ta to Td is set by using a prohibition region table tbl that is stored in the RAM 56. Here, before the processing routine in FIG. 2 to FIG. 6 is described, a brief description will be made on a setting method of the target time of switching of each of the transistors Ta to Td, contents of the prohibition region table tbl, and the like.

Figure 7:
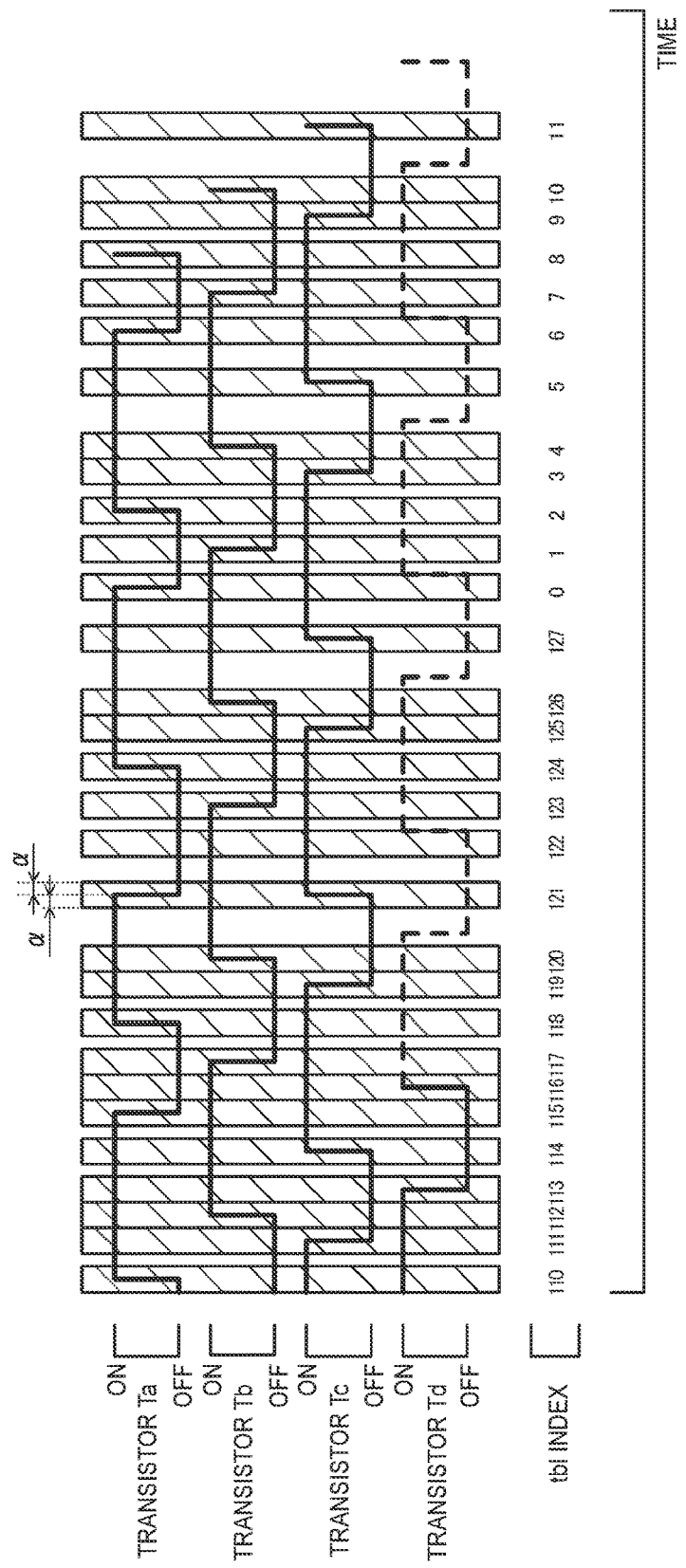
FIG. 7 is an explanatory graph of an example of a relationship between each superimposition prohibition region in a prohibition region table tbl and target times of switching of transistors Ta to Td in boost converters 40a to 40d.

FIG. 7 is an explanatory graph that shows an example of a relationship between each superimposition prohibition region in the prohibition region table tbl and the each target time of switching of the transistors Ta to Td in the boost converters 40a to 40d. FIG. 8 is an explanatory table of an example of the prohibition region table tbl. In FIG. 7, each hatched region corresponds to the superimposition prohibition region, "tbl INDEX" includes numbers that are assigned to the superimposition prohibition regions in the prohibition region table tbl, and a solid line portion and a broken line portion of an ON/OFF waveform of each of the transistors Ta to Td respectively represent a portion that has already been set and a portion that will be set from now. In FIG. 8, "INDEX" includes numbers that are assigned to the superimposition prohibition regions in the prohibition region table tbl.

The each target time of switching of the transistors Ta to Td corresponds to time at which ON/OFF of each of the transistors Ta to Td in FIG. 7 is switched. As shown in FIG. 7, each of the superimposition prohibition regions is a region that includes the target time of switching of one of the transistors Ta to Td in the boost converters 40a to 40d. In the embodiment, by the processing routine in FIG. 2 to FIG. 6, the each target time of switching of the transistors Ta to Td is set in a manner not to be superimposed on the superimposition prohibition regions in the prohibition region table tbl. For example, as indicated by the broken line in FIG. 7, the each target time of switching of the transistor Td is set in such a manner as to avoid the superimposition prohibition regions. Note that, in the embodiment, in the case where the target time of switching of the transistor is the same as start time or end time of the superimposition prohibition region, it is determined that the target time is not superimposed on the start time or the end time of the superimposition prohibition region.

As shown in FIG. 8, the prohibition region table tbl is a table that defines the start time and the end time of each of the superimposition prohibition regions. Each of the superimposition prohibition regions is, basically set as a region whose start time is set to time that is acquired by subtracting a specified value α from the target time of switching of the transistor and whose end time is set to time that is acquired by adding the specified value α to the target time (a region twice as long as the specified value α) (see FIG. 7). Each of the target time, the start time, and the end time is defined as a timer value (a timer value circulated from 0 to a maximum timer value TIMER_MAX). The specified value α is defined as a value required to suppress a voltage surge of the high-voltage side power line 44, which is generated by the superimposition of the time (the timing) of switching of the transistors Ta to Td in the boost converters 40a to 40d. Here, there is a case where one of the superimposition prohibition regions is combined with another of the superimposition prohibition regions and the combined superimposition prohibition region becomes longer than the region twice as long as the specified value α. In addition, in the prohibition region table tbl, the each target time of switching of the transistors Ta to Td in the boost converters 40a to 40d, on which the superimposition prohibition regions are based, is not defined.

In the embodiment, 65535 is used as the maximum timer value TIMER_MAX. In addition, as shown in FIG. 8, 128 is used as the number BUFF_SIZE of the superimposition prohibition region in the prohibition region table tbl, and 5 is used as the specified value α (a value twice as large as the specified value α, that is, a difference between the end time and the start time of each of the superimposition prohibition regions is basically 10). Note that the maximum timer value TIMER_MAX, the number BUFF_SIZE of the superimposition prohibition region, and the specified value α are not limited to the above values and are appropriately set.

Next, a description will be made on the processing routine in FIG. 2 to FIG. 6. Once the processing routine is initiated, the CPU 52 of the electronic control unit 50 initially determines whether this routine is executed for the first time in a current trip (in a period from turn-on to turn-off of the start switch 60) (step S100). If determining that this routine is executed for the first time in the current trip, the CPU 52 of the electronic control unit 50 executes initialization processing of the prohibition region table tbl (step S110 to S150). On the other hand, if determining in step S100 that this routine is not executed for the first time (the second time or later) in the current trip, the CPU 52 of the electronic control unit 50 does not execute the initialization processing.

In the initialization processing, initially, as expressed by the formula (1), a start point i_st in the prohibition region table tbl is set to 0. Then, as expressed by the formula (2), an end point i_end in the prohibition region table tbl is set to a value that is acquired by subtracting 1 from an initial value TBL_SIZE_INI of the number of the superimposition prohibition regions in a converted prohibition region table tbl2, which will be described below (step S110). Here, the start point i_st and the end point i_end are used when the converted prohibition region table tbl2 is created from the prohibition region table tbl. In addition, in the embodiment, 30 is used as the initial value TBL_SIZE_INI. However, the initial value TBL_SIZE_INI is not limited thereto and is appropriately set.

$$i\_st \leftarrow 0 \tag{1}$$

$$i\_end \leftarrow TBL\_SIZE\_INI-1 \tag{2}$$

Next, a variable j1 is set to 0 (step S120). As expressed by the formula (3), start time tbl_lwr[j1] of a superimposition prohibition region [j1] in the prohibition region table tbl is set to a value that is acquired by adding 1 to the maximum timer value TIMER_MAX and subtracting a value three times as long as the specified value α from the added value. In addition, as expressed by the formula (4), end time tbl_upr[j1] of the superimposition prohibition region [j1] in the prohibition region table tbl is set to a value that is acquired by adding 1 to the maximum timer value TIMER_MAX and subtracting the specified value α from the added value (step S130).

$$tbl\_lwr[j1] \leftarrow TIMER\_MAX+1-3\alpha \tag{3}$$

$$tbl\_upr[j1] \leftarrow TIMER\_MAX+1-\alpha \tag{4}$$

Here, when it is considered that the timer value is circulated from 0 to the maximum timer value TIMER_MAX, the value that is acquired by adding 1 to the maximum timer value TIMER_MAX means the same time as 0. By the processing in step S130, the initialized superimposition prohibition region [j1] becomes a region from time that is prior to 0 by the value twice as long as the specified value α and the specified value α to time that is prior to 0 by the value twice as large as the specified value α and to which the specified value α is added (a region from −3α to +α). In this way, even in the case where target time of switching of a newly added transistor is 0, and the superimposition prohibition region that is based on such a target time is a region from time prior to 0 by the specified value α to time after the specified value α from 0 (a region from −α to +α), it is possible to prevent the superimposition of the newly added superimposition prohibition region on the initialized superimposition prohibition region in the prohibition region table tbl. Note that in the embodiment, in the case where the end time of one of the two superimposition prohibition regions is the same as the start time of the other, it is determined that these two superimposition prohibition regions are not superimposed on each other.

Then, the variable j1 is updated by adding 1 thereto (step S140). Thereafter, the updated variable j1 is compared to the number BUFF_SIZE of the superimposition prohibition region in the prohibition region table tbl (step S150). If the variable j1 is smaller than the number BUFF_SIZE of the superimposition prohibition region, the processing returns to step S130.

The processing from step S130 to step S150 is executed until the variable j1 becomes equal to the number BUFF_SIZE of the superimposition prohibition region in step S150. If the variable j1 is equal to the number BUFF_SIZE of the superimposition prohibition region in step S150, the initialization processing is terminated.

By the processing in steps S110 to S150, the start point i_st and the end point i_end in the prohibition region table tbl, the start time tbl_lwr[0] to [BUFF_SIZE−1] and the end time tbl_upr[0] to tbl_upr[BUFF_SIZE−1] of the superimposition prohibition regions [0] to [BUFF_SIZE−1] are initialized.

Next, a target boost converter is set from the boost converters 40a to 40d (step S160) (step S160). Of the boost converters 40a to 40d, the target boost converter is the boost converter for which the target time (the target timing) of switching of the transistor is set, in the embodiment, the target boost converter is set in an order of the boost converters 40a, 40b, 40c, 40d, 40a, . . . .

Once the target boost converter is set in step S160, the number tbl_size of the superimposition prohibition regions in the converted prohibition region table tbl2, which will be described below, is set to a value that is calculated from the formula (5) by using the start point i_st and the end point i_end in the prohibition region table tbl and the number BUFF_SIZE of the superimposition prohibition regions in the prohibition region table tbl (step S170). Here, as the start point i_st and the end point i_end, the value that is set in above-described step S110 is used when the current routine is executed for the first time in the current trip, and the value that is set by processing in step S740, which will be described below, is used when the current routine is not executed for the first time (is executed for the second time or later) in the current trip. The number tbl_size of the superimposition prohibition regions that is acquired by the processing in this step S170 is equal to the above-described initial value TBL_SIZE_INI.

$$\text{tbl\_size} \leftarrow \text{mod}((i\_end - i\_st + 1 + \text{BUFF\_SIZE}), \text{BUFF\_SIZE}) \quad (5)$$

Next, the converted prohibition region table tbl2 is created from the prohibition region table tbl (step S180 to S230). FIG. 9 includes explanatory tables of creation processing of the converted prohibition region table tbl2. An upper portion of FIG. 9 is an explanatory table of the example of the prohibition region table tbl (the same as FIG. 8), and a lower portion of FIG. 9 is an explanatory table of an example of the converted prohibition region table tbl2. In the lower portion of FIG. 9, "INDEX" includes numbers that are assigned to the superimposition prohibition regions in the converted prohibition region table tbl2. The converted prohibition region table tbl2 is a table in which the index of the superimposition prohibition regions in the prohibition region table tbl is changed ("i_st" to "i_end" are changed to "0" to "tbl_size−1") and in which the start time and the end time of each of the superimposition prohibition regions are changed to relative start time and relative end time to start time tbl_lwr[i_st] of a superimposition prohibition region [i_st] in the prohibition region table tbl.

In the creation processing of the converted prohibition region table tbl2, initially, variables j2, j3 are set (step S180). In this processing, the variable j2 is set to 0, and the variable j3 is set to a value that is calculated from the formula (6) by using the variable j2 as well as the start point i_st and the number BUFF_SIZE of the superimposition prohibition region in the prohibition region table tbl.

$$j3 \leftarrow \text{mod}((i\_st + j2), \text{BUFF\_SIZE}) \quad (6)$$

Next, relative start time tbl2_lwr[j2] and relative end time tbl2_upr[j2] of a superimposition prohibition region [j2] in the converted prohibition region table tbl2 are set to values that are calculated from the formula (7) and the formula (8) by using start time tbl_lwr[j3] and end time tbl2_upr[j3] of the superimposition prohibition region [j3] in the prohibition region table tbl, the start time tbl_lwr[i_st] of the superimposition prohibition region [i_st] in the prohibition region table tbl, and the maximum timer value TIMER_MAX (step S190).

$$\text{tbl2\_lwr}[j2] \leftarrow \text{mod}((\text{tbl\_lwr}[j3] - \text{tbl\_lwr}[i\_st] + \text{TIMER\_MAX}), \text{TIMER\_MAX}) \quad (7),$$

$$\text{tbl2\_upr}[j2] \leftarrow \text{mod}((\text{tbl\_upr}[j3] - \text{tbl\_lwr}[i\_st] + \text{TIMER\_MAX}), \text{TIMER\_MAX}) \quad (8)$$

Then, the variable j2 is updated by adding 1 thereto, and the variable j3 is updated by the above-described formula (6) (step S200). Thereafter, the updated variable j2 is compared to the number tbl_size of the superimposition prohibition regions in the converted prohibition region table tbl2 (step S210). If the variable j2 is smaller than the number tbl_size of the superimposition prohibition regions, the processing returns to step S190.

The processing from step S190 to step S210 is repeatedly executed until the variable j2 becomes equal to the number tbl_size of the superimposition prohibition regions in step S210. In this way, the relative start time tbl2_lwr[0] to tbl2_lwr[tbl_size−1] and the relative end time tbl2_upr[0] to tbl2_upr[tbl_size−1] of the superimposition prohibition regions [tbl_size−1] in the converted prohibition region table tbl2 are set. If the variable j2 is equal to the number tbl_size of the superimposition prohibition regions in step S210, the creation processing of the converted prohibition region table tbl2 is terminated.

FIG. 9 shows the case where the start point i_st, and the end point i_end in the prohibition region table tbl are 110 and 11 and where the number tbl_size of the superimposition prohibition regions in the converted prohibition region table tbl2 is 30. In this FIG. 9, the relative start time tbl2_lwr[0] and relative end time tbl2_upr[0] of a superimposition prohibition region [0] in the converted prohibition region table tbl2 are set to values that are calculated from the formula (6) to the formula (8) described above by using start time tbl_lwr[110] (=65195) and end time tbl_upr[110] (=65205) of a superimposition prohibition region [110] in the prohibition region table tbl as well as the maximum timer value TIMER_MAX (=65535), that is, 0 and 10. Similarly, the relative start time tbl2_lwr[j2] and the relative end time tbl2_upr[j2] of the superimposition prohibition region [j2] in the converted prohibition region table tbl2 are set to values that are calculated from the formula (7) and the formula (8) by using the start time tbl_lwr[110] as well as the start time tbl_lwr[j3] and the end time tbl_lwr[j3] the superimposition prohibition region [j3 (=mod((110+j2), 128), j2: 1 to 29] in the prohibition region table tbl.

Figures 10, 11:
FIG. 10 is an explanatory table of an example of an additional signal table drv.
FIG. 11 includes explanatory tables of creation processing of a converted additional signal table drv2.

When the creation processing of the converted prohibition region table tbl2 is terminated just as described, additional signal table drv is created (step S220). FIG. 10 is an explanatory table of an example of the additional signal table drv. The additional signal table drv, is a table in which requested time (requested timing) of each additional signal related to switching of the transistor in the target boost converter is defined. In FIG. 10, "INDEX" includes numbers that are assigned to the additional signals in the additional signal table drv. The requested time of each of the additional signals is set on the basis of the target duty cycle of the target boost converter, and is defined as the timer value (the timer value circulated from 0 to the maximum tinier value TIMER_MAX).

In the embodiment, 8 is used for the number SIG_SIZE of the additional signals in the additional signal table drv and a converted additional signal table drv2, which wilt be described below. Note that the number SIG_SIZE of the additional signals is not limited thereto and is appropriately set.

Next, the converted additional signal table dvr2 is created from the additional signal table drv (step S230 to S260). FIG. 11 includes explanatory tables of creation processing of the converted additional signal table drv2. An upper portion of FIG. 11 is an explanatory table of an example of the additional signal table drv (the same as FIG. 10), and a lower portion of FIG. 11 is an explanatory table of an example of the converted additional signal table drv2. In the lower portion of FIG. 11, "INDEX" includes numbers that are assigned to the additional signals in the converted additional signal table drv2. The converted additional signal table drv2 is a table in which the requested time of each of the additional signals in the additional signal table drv is changed to relative requested time to the start time tbl_lwr [i_st] of the superimposition prohibition region [i_st] in the prohibition region table tbl.

In the creation processing of the converted additional signal table drv2, initially, a variable i1 is set to 0 (step S230). Next, relative requested time drv2a[i1] of the additional signal [i1] in the converted additional signal table drv2 is set to a value that no is calculated from the formula (9) by using requested time drv[i1] of the additional signal [i1] in the additional signal table drv, the start time tbl_lwr [i_st] of the superimposition prohibition region [i_st] in the prohibition region table tbl, and the maximum timer value TIMER_MAX (step S240).

$$drv2a[i1] \leftarrow mod((drv[i1]-tbl\_lwr[i\_st]+TIMER\_MAX), TIMER\_MAX) \quad (9)$$

Then the variable i1 is updated by adding 1 thereto (step S250). Thereafter, the updated variable i1 is compared to the number SIG_SIZE of the additional signals (step S260). If the variable i1 is smaller than the number SIG_SIZE of the additional signals, the processing returns to step S240.

The processing from step S240 to step S260 is repeatedly executed until the variable i1 becomes equal to the number SIG_SIZE of the additional signals in step S260. In this way, the relative requested time drv2a[0] to drv2a[SIG_SIZE-1] of the additional signals [0] to [SIG_SIZE-1] in the converted additional signal table drv2 are set. If the variable i1 is equal to the number SIG_SIZE of the additional signals in step S260, the creation processing of the converted additional signal table drv2 is terminated.

Similar to FIG. 9, FIG. 11 shows the case where, the start point i_st in the prohibition region table tbl is 110 and where the start time tbl_lwr[110] of the superimposition prohibition region [110] is 65195. In this FIG. 11, the relative requested time drv2a[0] of the additional signal [0] in the converted additional signal table drv2 is set to a value that is calculated from the above-described formula (9) by using the requested time drv[0] (=65335) of the additional signal [0] in the additional signal table drv, the start time tbl_lwr [110] (=65195) of the superimposition prohibition region [110] in the prohibition region table tbl, and the maximum timer value TIMER_MAX (=65535), that is, 140. Similarly, the relative requested time drv2a[i1] of the additional signal [i1] in the converted additional signal table drv2 is set to a value that is calculated from the formula (9) by using the requested time drv[i1] of the additional signals [i1 (i1: 1 to 7)] in the additional signal table drv and the start time tbl_lwr[110].

When the creation processing of the converted additional signal table drv2 is terminated just as described, a variable i2 is set to 0 (step S270), and a variable j4 is set to 0 (step S280). Then, relative requested time drv2a[i2] of the additional signal [i2] in the converted additional signal table drv2 is compared to relative end time tbl2_upr[j4] of the superimposition prohibition region [j4] in the converted prohibition region table tbl2 (step S290). This processing in step S290 is processing to determine whether the relative requested time drv2a[i2] of the additional signal [i2] is possibly superimposed on the superimposition prohibition region [j4].

Figure 12A:
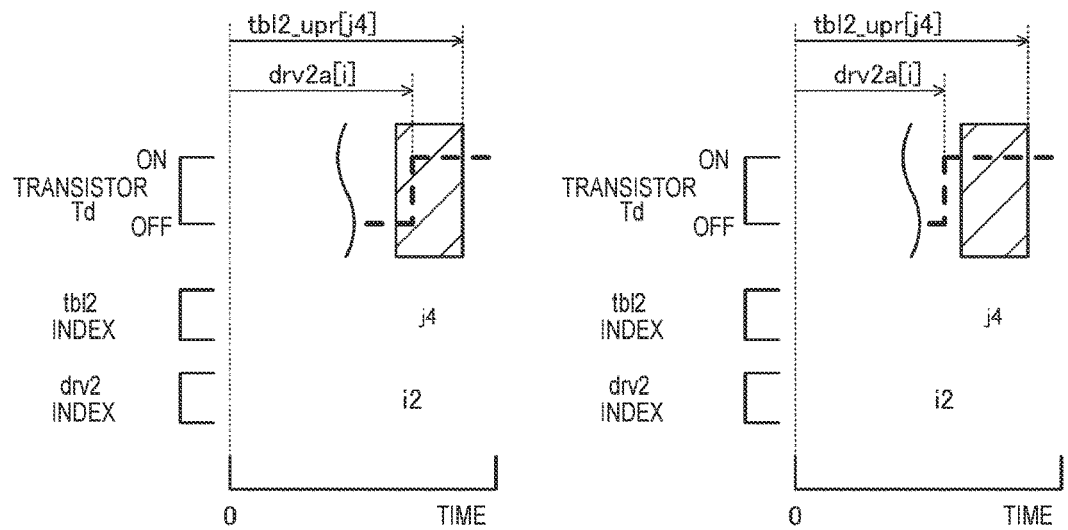
FIG. 12A includes explanatory graphs, each of which shows a relationship between relative requested time drv2a[i2] of an additional signal [i2] and relative end time tbl2_upr[j4] of a superimposition prohibition region [j4]
Figure 12B:
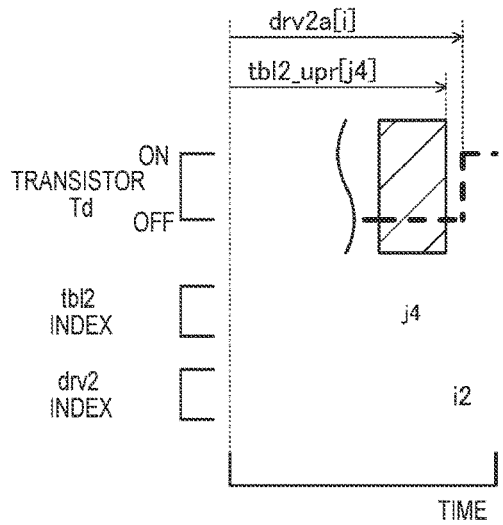
FIG. 12B is an explanatory graph that shows the relationship between the relative requested time drv2a[i2] of the additional signal [i2] and the relative end time tbl2_upr[j4] of the superimposition prohibition region [j4]

FIG. 12A and FIG. 12B include explanatory graphs, each of which shows a relationship between the relative requested time drv2a[i2] of the additional signal [i2] and the relative end time tbl2_upr[j4] of the superimposition prohibition region [j4].

FIG. 12A shows the ease where the relative requested time drv2a[i2] is earlier than the relative end time tbl2_upr [j4] of the superimposition prohibition region [j4]. FIG. 12B shows the case where the relative requested time drv2a[i2] is equal to or later than the relative end time tbl2_upr[j4] of the superimposition prohibition region [j4]. The case in FIG. 12A includes: the case where the relative requested time drv2a[i2] is superimposed on the superimposition prohibition region [j4] as shown in a left portion; and the case where the relative requested time drv2a[i2] is not superimposed on the superimposition prohibition region [j4] as shown in a right portion. Thus, in the case of FIG. 12A, it can be said that the relative requested time drv2a[i2] is possibly superimposed on the superimposition prohibition region [j4]. In the case of FIG. 12B, the relative requested time drv2a[i2] is not superimposed on the superimposition prohibition region [j4]. It can be said that the processing in step S290 is the processing to determine whether a current situation corresponds to FIG. 12A or FIG. 12B.

If the relative requested time drv2a[i2] of the additional signal [i2] is equal to or later than the relative end time tbl2_upr[j4] of the superimposition prohibition region [j4] in step S290, such a case corresponds to FIG. 12B, and it is determined that the relative requested time drv2a[i2] of the additional signal [i2] is not superimposed on the superimposition prohibition region [j4]. Then, the variable j4 is updated by adding 1 thereto (step S300). Thereafter, the updated variable j4 is compared to the number tbl_size of the superimposition prohibition regions in the converted prohibition region table tbl2 (step S310). If the variable [j4] is smaller than the number tbl_size of the superimposition prohibition regions, the processing returns to step S290.

If the relative requested time drv2a[i2] of the additional signal [i2] is earlier than the relative end time tbl2_upr[j4] of the superimposition prohibition region [j4] in step S290, such a case corresponds to FIG. 12A, and it is determined that the relative requested time drv2a[i2] of the additional signal [i2] is possibly superimposed on the superimposition prohibition region [j4]. Then, the relative requested time drv2a[i2] of the additional signal [i2] is compared to relative start time tbl2_lwr[j4] of the superimposition prohibition region [j4] (step S320). This processing is processing to determine whether the relative requested time drv2a[i2] of the additional signal [i2] is superimposed on the superimposition prohibition region [j4].

Figure 13A:
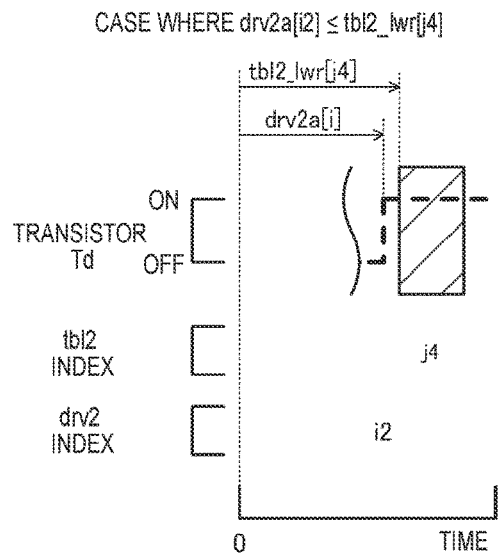
FIG. 13A is an explanatory graph that shows a relationship between the relative requested time drv2a[i2] of the additional signal [i2] and relative start time tbl2_lwr[j4] of the superimposition prohibition region [j4]
Figure 13B:
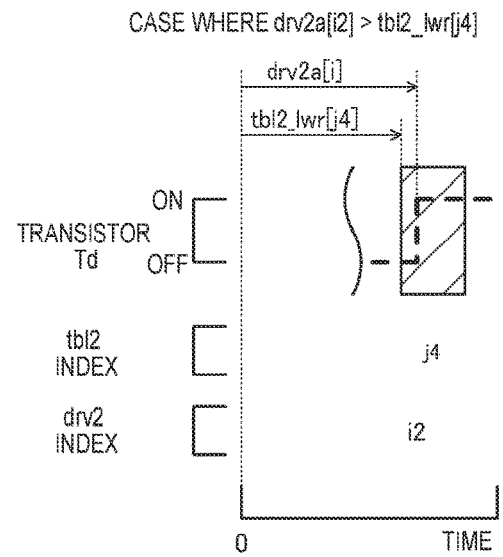
FIG. 13B is an explanatory graph that shows the relationship between the relative requested time drv2a[i2] of the additional signal [i2] and the relative start time tbl2_lwr[j4] of the superimposition prohibition region [j4]

FIG. 13A and FIG. 13B are explanatory graphs, each of which shows a relationship between the relative requested time drv2a[i2] of the additional signal [i2] and the relative start time tbl2_lwr[j4] of the superimposition prohibition region [j4]. FIG. 13A shows the case where the relative requested time drv2a[i2] is equal to or earlier than the relative start time tbl2_lwr[j4], and FIG. 13B shows the case where the relative requested time drv2a[i2] is later than the relative start time tbl2_lwr[j4]. In the case of FIG. 13A, the relative requested time drv2a[i2] is not superimposed on the superimposition prohibition region [j4]. Meanwhile, in the case of FIG. 13B, the relative requested time drv2a[i2] is superimposed on the superimposition prohibition region [j4]. It can be said that the processing in step S320 is processing to determine whether the current situation corresponds to FIG. 13A or FIG. 13B.

If the relative requested time drv2a[i2] of the additional signal [i2] is equal to or earlier than the relative start time tbl2_lwr[j4] of the superimposition prohibition region [j4] in step S320, such a case corresponds to FIG. 13A, and it is determined that the relative requested time drv2a[i2] of the additional signal [i2] is not superimposed on the superimposition prohibition region [j4]. Then, the relative requested time drv2a[i2] of the additional signal [i2] is set to relative target time drv2b[i2] (step S330), and relative start time drv2_lwr and relative end time drv2_upr of the superimposition prohibition region [i2] based on the additional signal [i2] are set (step S390). In the processing in step S390, as expressed by the formula (10), the relative start time drv2_lwr of the superimposition prohibition region [i2] is set to a value that is acquired by subtracting the specified value α from the relative target time drv2b[i2] of the additional signal [i2]. In addition, as expressed by the formula (11), the relative end time drv2_upr of the superimposition prohibition region [i2] is set to a value that is acquired by adding the specified value α to the relative target time drv2b[i2] of the additional signal [i2].

$$\text{drv2\_lwr} \leftarrow \text{drv2b}[i2] - \alpha \quad (10)$$

$$\text{drv2\_upr} \leftarrow \text{drv2b}[i2] + \alpha \quad (11)$$

If the relative requested time drv2a[i2] of the additional signal [i2] is later than the relative start tune tbl2_lwr[j4] of the superimposition prohibition region [j4] in step S320, such a ease corresponds to FIG. 13B, and it is determined that the relative requested time drv2a[i2] of the additional signal [i2] is superimposed on the superimposition prohibition region [j4]. Then, central time tbl2_c of the superimposition prohibition region [j4] is set (step S340). In this processing, as expressed by the formula (12), the central time tbl2_c of the superimposition prohibition region [j4] is set tea value that is acquired by dividing a sum of the relative start time tbl2_lwr[j4] and the relative end time tbl2_upr[j4] of the superimposition prohibition region [j4] by 2.

$$\text{tbl2\_c} \leftarrow (\text{tbl2\_lwr}[j4] + \text{tbl2\_upr}[j4])/2 \quad (12)$$

Next, the relative requested time drv2a[i2] of the additional signal [i2] is compared to the central time tbl2_c of the superimposition prohibition region [j4] (step S350). This processing is processing to determine whether the relative requested time drv2a[i2] of the additional signal [i2] is superimposed on a front-half portion or a latter-half portion of the superimposition prohibition region [j4].

Figure 14A:
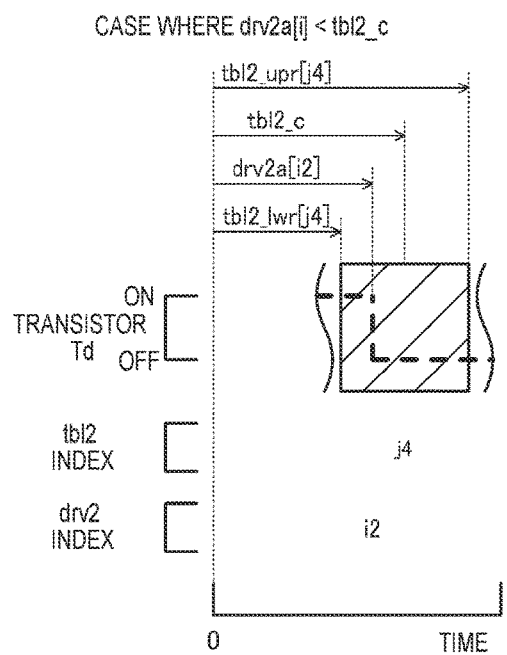
FIG. 14A is an explanatory graph that shows a relationship between the relative requested time drv2a[i2] of the additional signal [i2] and central time tbl2_c of the superimposition prohibition region [j4]
Figure 14B:
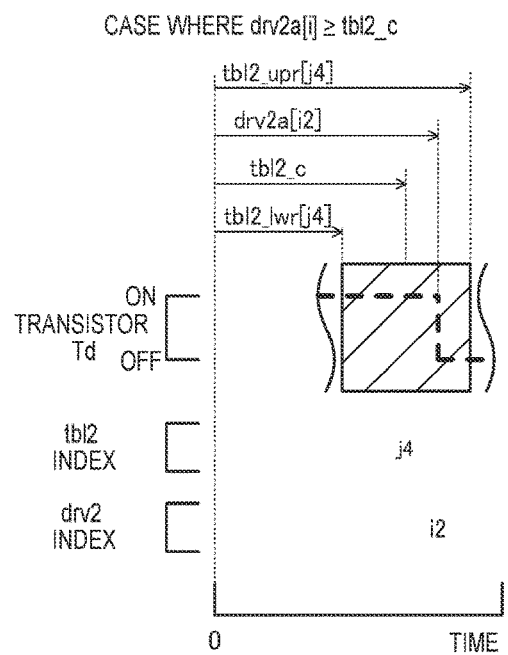
FIG. 14B is an explanatory graph that shows the relationship between the relative requested time drv2a[i2] of the additional signal [i2] and the central time tbl2_c of the superimposition prohibition region [j4]

FIG. 14A and FIG. 14B are explanatory graphs, each of which shows a relationship between the relative requested tune drv2a[i2] of the additional signal [i2] and the central time tbl2_c of the superimposition prohibition region [j4]. FIG. 14A shows a case where the relative requested time drv2a[i2] is earlier than the central time tbl2_c, and FIG. 14B shows the case where the relative requested time drv2a[i2] is equal to or later than the central time tbl2_c. In the case of FIG. 14A, the relative requested time drv2a[i2] is superimposed on the front-half portion of the superimposition prohibition region [j4]. In the case of FIG. 14B, the relative requested time drv2a[i2] is superimposed on the latter-half portion of the superimposition prohibition region [j4]. It can be said that the processing in step S350 is processing to determine whether the current situation corresponds to FIG. 14A or FIG. 14B.

If the relative requested time drv2a[i2] of the additional signal [i2] is earlier than the central time tbl2_c of the superimposition prohibition region [j4] in step S350, such a case corresponds to FIG. 14A, and it is determined that the relative requested time drv2a[i2] of the additional signal [i2] is superimposed on the front-half portion of the superimposition prohibition region [j4]. Then, as expressed by the formula (13), an offset value drv_ofs is set to a value that is acquired by subtracting the relative requested time drv2a[i2] of the additional signal [i2] from the relative start time tbl2_lwr[j4] of the superimposition prohibition region [j4] (step S360). Thereafter, as expressed by the formula (14), the relative target time drv2b[i2] is set to a value that is acquired by adding the offset value drv_ofs to the relative requested time drv2a[i2] of the additional signal [i2] (step S380).

$$\text{drv\_ofs} \leftarrow \text{tbl2\_lwr}[j4] - \text{drv2a}[i2] \quad (13)$$

$$\text{drv2b}[i2] \leftarrow \text{drv2a}[i2] + \text{drv\_ofs} \quad (14)$$

When the formula (13) and the formula (14) are summarized, the processing in steps S360, S380 is processing to set the relative start time tbl2_lwr[j4] the superimposition prohibition region [j4] to the relative target time drv2b[i2] of the additional signal [i2]. FIG. 15 includes explanatory graphs that show a state of the processing in steps S360, S380. Thereafter, by the processing in step S390 described above, the relative start time drv2_lwr and the relative end time drv2_upr of the superimposition prohibition region [i2] based on the additional signal [i2] are set.

If the relative requested time drv2a[i2] of the additional signal [i2] is equal to or later than the central time tbl2_c of the superimposition prohibition region [j4] in step S350, such a case corresponds to FIG. 14B, and it is determined that the relative requested time drv2a[i2] of the additional signal [i2] is superimposed on the latter-half portion of the superimposition prohibition region [j4]. Then, as expressed by the formula (15), the offset value drv_ofs is set to a value that is acquired by subtracting the relative requested time drv2a[i2] of the additional signal [i2] from the relative end time tbl2_upr[j4] of the superimposition prohibition region [j4] (step S370). Thereafter, by the processing in step S380 described above, the relative target time drv2b[i2] of the additional signal [i2] is set.

$$\text{drv\_ofs} \leftarrow \text{tbl2\_upr}[j4] - \text{drv2a}[i2] \tag{15}$$

Figure 16:
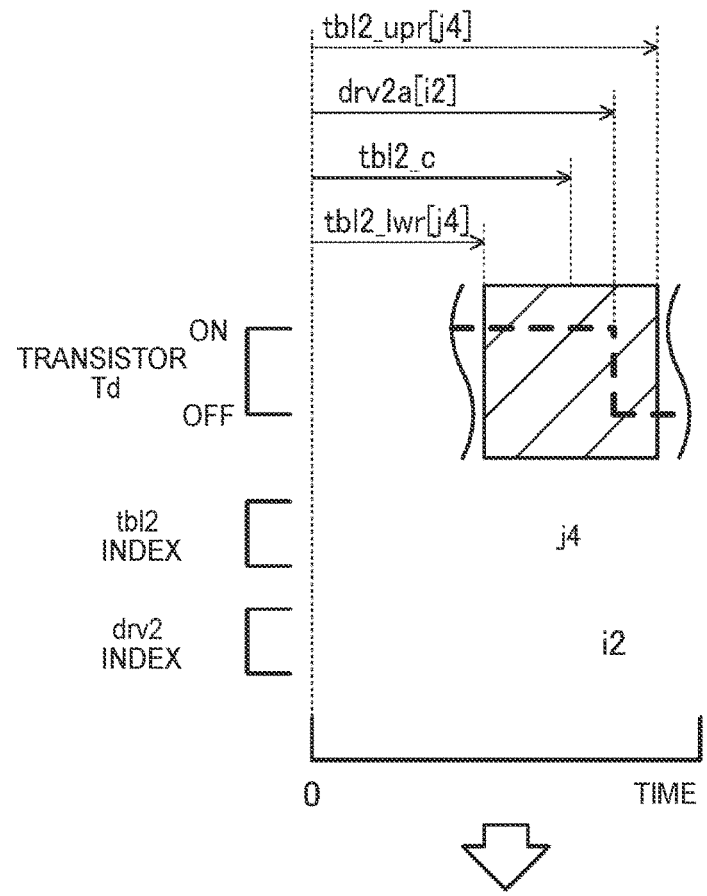
FIG. 16 includes explanatory graphs that show a state of processing in steps S370, S380.

When the formula (14) and the formula (15) are summarized, the processing in steps S370, S380 is processing to set the relative end time tbl2_upr[j4] of the superimposition prohibition region [j4] to the relative target time drv2b[i2] of the additional signal [i2]. FIG. 16 includes explanatory graphs that show a state of the processing in steps S370, S380. Thereafter, by the processing in step S390 described above, the relative start time drv2_lwr and the relative end time drv2_upr of the superimposition prohibition region [i2] based on the additional signal [i2] are set.

If the variable j4 is equal to the number tbl_size of the superimposition prohibition regions in step S310, the relative requested time drv2a[i2] becomes equal to or later than the relative end time tbl2_upr[j4] regardless of the variable j4 that ranges from 0 to (tbl_size−1) (corresponds to FIG. 14A). That is, it is determined that the relative requested time drv2a[i2] of the additional signal [i2] is superimposed on none of the superimposition prohibition regions in the converted prohibition region table tbl2. Then, the relative target time drv2b[i2] of the additional signal [i2] is set by the above-described processing in step S330, and the relative start time drv2_lwr and the relative end time drv2_upr of the superimposition prohibition region [i2] based on the additional signal [i2] are set by the above-described processing in step S390.

By the processing from step S280 to step S380 described above, the relative target time drv2b[i2] of the additional signal [i2] can be set in a manner not to be superimposed on the superimposition prohibition region [j4]. Then, by the processing in step S390 the relative start time drv2_lwr and the relative end time drv2_upr of the superimposition prohibition region [i2] based on the additional signal [i2] can be set.

In the following description, there is a case where the superimposition prohibition region [i2] based on the additional signal [i2] will be referred to as an "additional region" and where the superimposition prohibition region [j4−1] and the superimposition prohibition region [j4] in the converted prohibition region table tbl2 will respectively be referred to as an "existing region [j4−1]" and an "existing region [j4]". The existing region [j4−1] is an existing region on a front side of the additional region, and the existing region [j4] is an existing region on a back side of the additional region. The superimposition prohibition regions [0] to [tbl_size−1] are defined in the converted prohibition region table tbl2. Thus, in the, case where the variable j4 is equal to the number tbl_size of the superimposition prohibition regions, the existing region [j4] does not exist.

Once the additional region is set just as described, the variable j4 is compared to the number tbl_size of the superimposition prohibition regions in the converted prohibition region table tbl2 (step S400). if the variable j4 is equal to the number tbl_size of the superimposition prohibition regions, the relative start time drv2_lwr of the additional region is compared to relative end time tbl2_upr[j4−1] of the existing region [j4−1] (step S410). In the case where the variable j4 is equal to the number tbl_size of the superimposition prohibition regions, the existing region [j4] does not exist as described above. Thus, the processing in step S410 is processing to determine whether the additional region is superimposed on the existing region [j4−1] (the existing region on the from side).

Figure 17A:
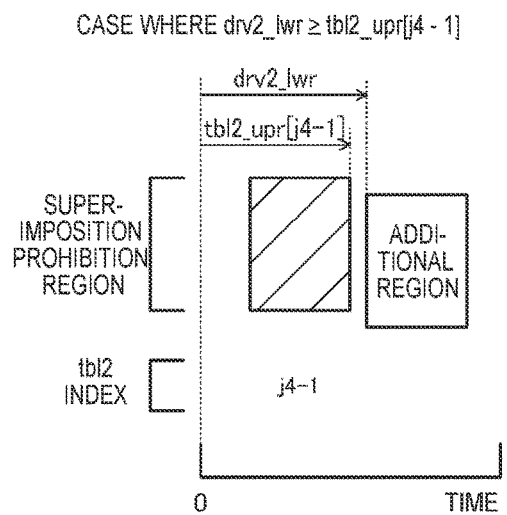
FIG. 17A is an explanatory graph that shows a relationship between an additional region and an existing region [j4−1] (an existing region on a front side) when a variable j4 is equal to the number tbl_size of the superimposition prohibition regions.
Figure 17B:
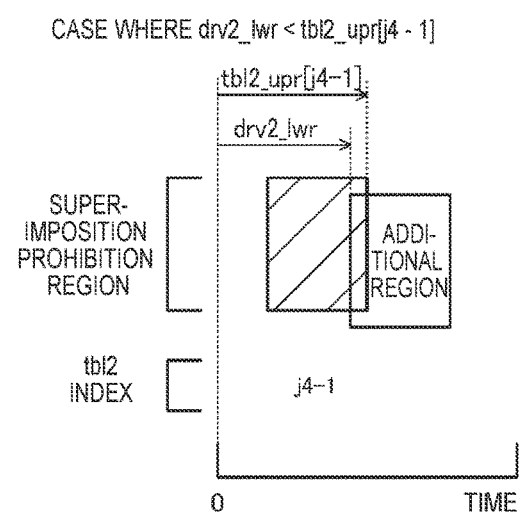
FIG. 17B is an explanatory graph that shows the relationship between the additional region and the existing region [j4−1] (the existing region on the front side) when the variable j4 is equal to the number tbl_size of the superimposition prohibition regions.

FIG. 17A and FIG. 17B are explanatory graphs each of which shows a relationship between the additional region and the existing region [j4−1] (the existing region on the front side) when the variable j4 is equal to the number tbl_size of the superimposition prohibition regions. FIG. 17A shows the case where the relative start time drv2lwr of the additional region is equal to or later than the relative end time tbl2_upr[j4−1] of the existing region [j4−1], and FIG. 17B is the case where the relative start time drv2_lwr of the additional region is earlier than the relative end time tbl2_upr[j4−1] of the existing region [j4−1]. In the case of FIG. 17A, the additions region is not superimposed on the existing region [j4−1]. Meanwhile, in the case of FIG. 17B, the additional region is superimposed on the existing region [j4−1] on the front side. It can be said that the processing in step S410 is processing to determine whether the current situation corresponds to FIG. 17A or FIG. 17B.

If the relative start time drv2_lwr of the additional region is equal to or later than the relative end time tbl2_upr[j4−1] of the existing region [j4−1] in step S410, such a case corresponds to FIG. 17A, and it is determined that the additional region is not superimposed on the existing region [j4−1] (step S450). Then, the number tbl_size of the superimposition prohibition regions in the converted prohibition region table tbl2 is updated by adding 1 thereto (step S460). Thereafter, the variable j4 is compared to a value that is acquired by subtracting 1 from the updated number tbl_size of the superimposition prohibition regions the number of the superimposition prohibition regions prior to the update) (step S470). The case where the variable j4 is equal to the value that is acquired by subtracting 1 from the updated number tbl_size of the superimposition prohibition regions (the number of the superimposition prohibition regions prior to the update) is considered. Thus, as expressed by the formula (16) and the formula (17), the relative start time drv2lwr and the relative end time drv2_upr of the additional region are set to the relative start time tbl2lwr[j4] and the relative end time tbl2upr[j4] of the superimposition prohibition region [j4] in the converted prohibition region table tbl2 (step S520).

$$\text{tbl2lwr}[j4] \leftarrow \text{drv2\_lwr} \tag{16}$$

$$\text{tbl2upr}[j4] \leftarrow \text{drv2\_upr} \tag{17}$$

Figure 18:
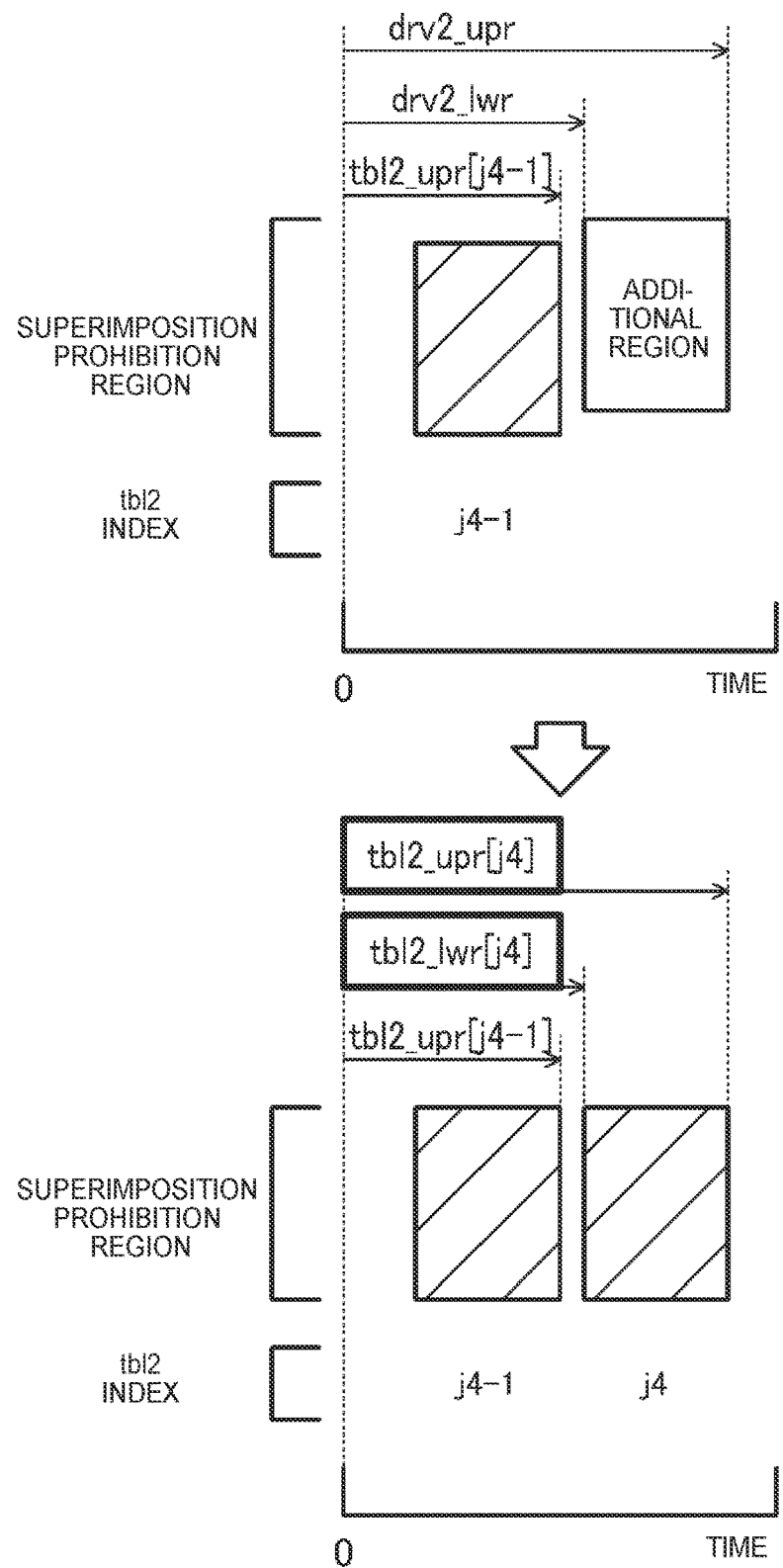
FIG. 18 includes explanatory graphs that show an updating state of the converted prohibition region table tbl2.
Figure 19:
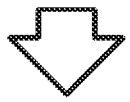
FIG. 19 includes explanatory tables that show the updating state of the converted prohibition region table tbl2.

FIG. 18 and FIG. 19 respectively include explanatory graphs and explanatory tables that show an updating state of the converted prohibition region table tbl2 in this case. Portions surrounded by bold lines in FIG. 18 and FIG. 19 are updated portions in the converted prohibition region table tbl2. in addition, FIG. 19 shows the case where the variable j4 is 30, the relative start time drv2_lwr and the relative end time drv2upr of the additional region are respectively 470 and 480, and the number tbl_size of the superimposition prohibition regions in the converted prohibition region table tbl2 prior to the update (prior to the processing in step S460) is 30.

In these FIG. 18 and FIG. 19, the number tbl_size of the superimposition prohibition regions is updated by adding 1 thereto (see step S460). Next, the relative start time drv2_lwr (=470) and the relative end time drv2_upr (=480) of the additional region are set to the relative start time tbl2lwr[j4] and the relative end time tbl2_upr[j4] of the superimposition prohibition region [j4(=30)] in the converted prohibition region table tbl2 (see step S520). That is, the converted prohibition region table tbl2 is updated by adding the additional region to the converted prohibition region table tbl2.

If the relative start time drv2lwr of the additional region is earlier than the relative end time tbl2_upr[j4−1] of the existing region [j4−1] in step S410, such a case corresponds to FIG. 17B, and it is determined, that the additional region is superimposed on the existing region [j4−1] (step S530). Then, as expressed by the formula (18), the relative end time drv2_upr of the additional region is set to the relative end time tbl2_upr[j4−1] of the existing region [j4−1] (step S540).

$$tbl2\_upr[j4-1] \leftarrow drv2\_upr \quad (18)$$

Figure 20:
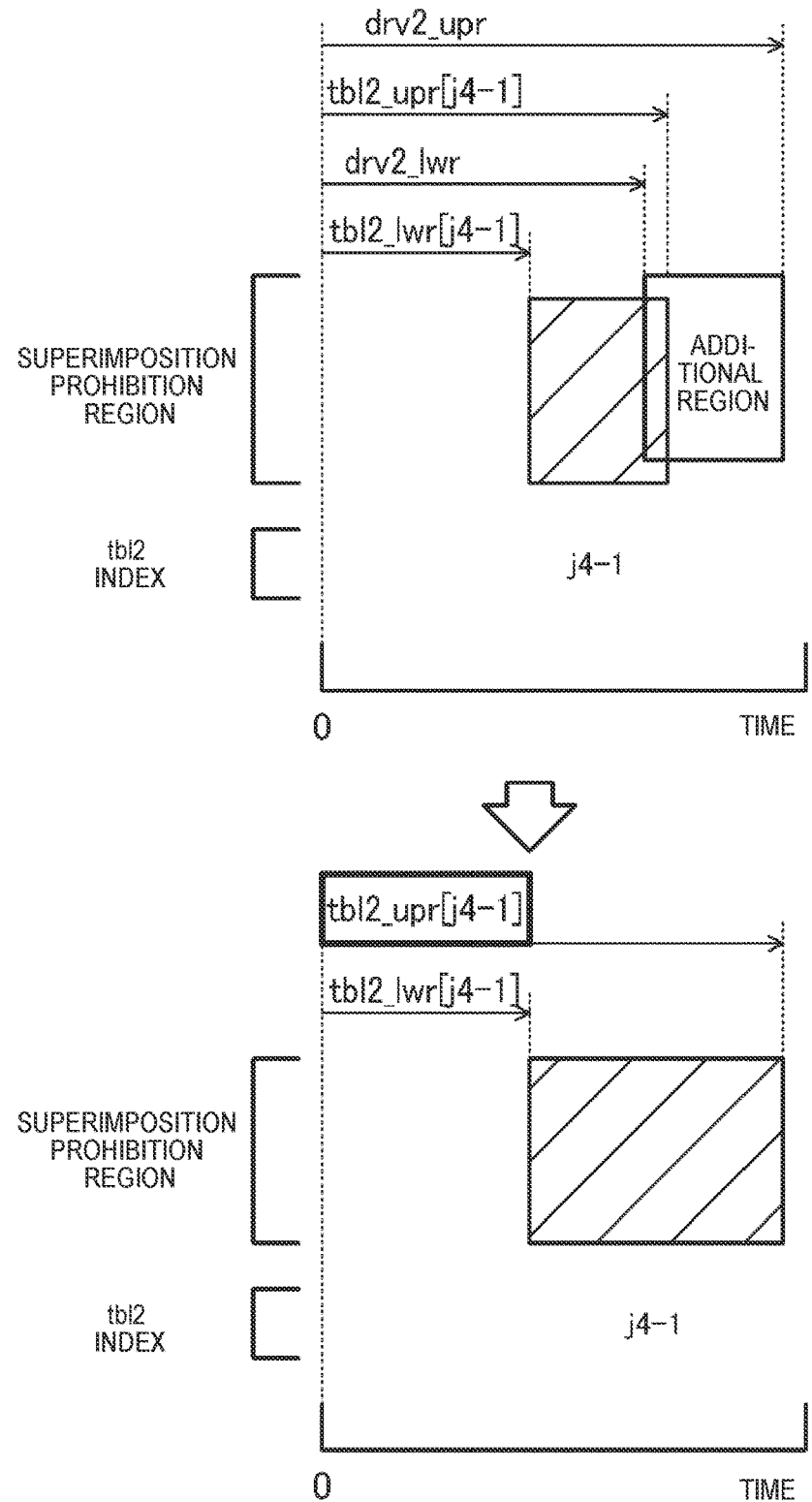
FIG. 20 includes explanatory graphs that show the updating state of the converted prohibition region table tbl2.
Figure 21:
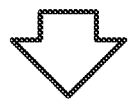
FIG. 21 includes explanatory tables that show the updating state of the converted prohibition region table tbl2.

FIG. 20 and FIG. 21 respectively include explanatory graphs and explanatory tables that show the updating state of the converted prohibition region table tbl2 in this case. Portions surrounded by bold lines in FIG. 20 and FIG. 21 are updated portions in the converted prohibition region table tbl2. in addition, FIG. 21 shows the case where the variable j4 is 30 and the relative end time drv2_upr of the additional region is 470. In these FIG. 20 and FIG. 21, the relative end time drv2_upr (=470) of the additional region is set to the relative end time tbl2_upr[j4−1] of the superimposition prohibition region [j4−1 (=29)] in the converted prohibition region table tbl2 (see step S540). That is, the additional region and the existing region [j4−1] are combined and defined as the new superimposition prohibition region in the converted prohibition region table tbl2. In this way, the converted prohibition region table tbl2 is updated.

If the variable j4 is smaller than the number tbl_size of the superimposition prohibition regions in the converted prohibition region table tbl2 in step S400, the relative start time drv2_lwr of the additional region is compared to the relative end time tbl2_upr[j4−1] of the existing region [j4−1] (step S420), and the relative end time drv2_upr of the additional region is compared to the relative start time tbl2_lwr[j4] of the existing, region [j4] (steps S430, S440). The processing in step S420 is processing to determine whether the additional region is superimposed on the existing region [j4−1] (the existing region on the front side), and the processing in steps S430, S440 is processing to determine whether the additional region is superimposed on the existing region [j4] (the existing region on the back side).

Figure 22A:
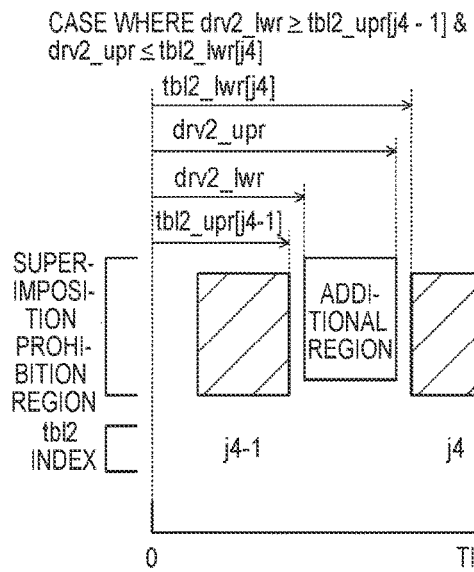
FIG. 22A is an explanatory graph that shows a relationship between the additional region and each of the existing region [j4−1] and the existing region [j4] when the variable j4 is smaller than the number tbl_size of the superimposition prohibition regions in the converted prohibition region table tbl2.
Figure 22B:
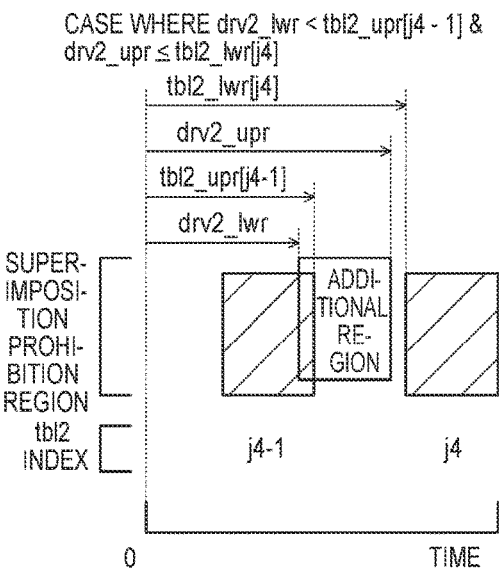
FIG. 22B is an explanatory graph that shows the relationship between the additional region and each of the existing region [j4−1] and the existing region [j4] when the variable j4 is smaller than the number tbl_size of the superimposition prohibition regions in the converted prohibition region table tbl2.
Figure 22C:
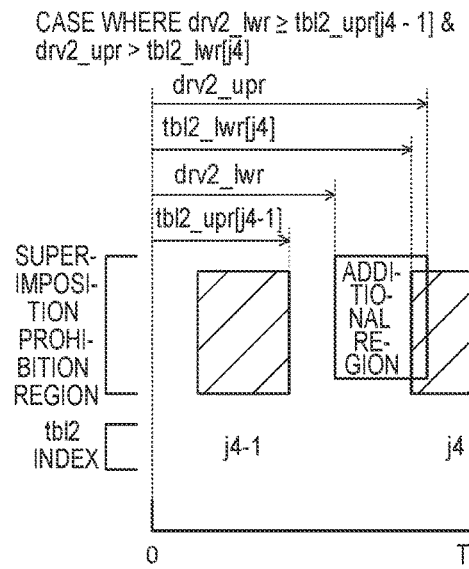
FIG. 22C is an explanatory graph that shows the relationship between the additional region and each of the existing region [j4−1] and the existing region [j4] when the variable j4 is smaller than the number tbl_size of the superimposition prohibition regions in the converted prohibition region table tbl2.
Figure 22D:
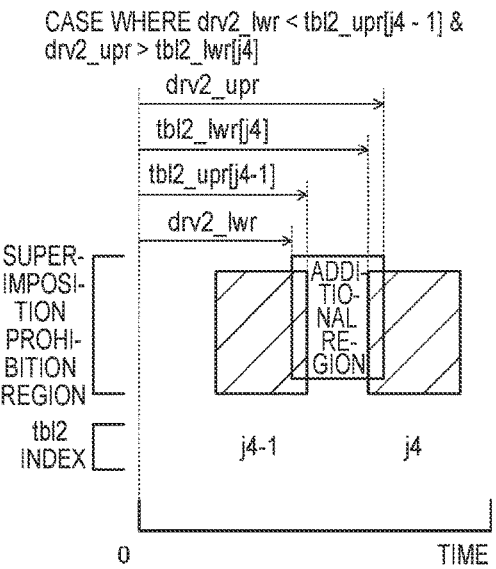
FIG. 22D is an explanatory graph that shows the relationship between the additional region and each of the existing region [j4−1] and the existing region [j4] when the variable j4 is smaller than the number tbl_size of the superimposition prohibition regions in the converted prohibition region table tbl2.

FIG. 22A, FIG. 22B, FIG. 22C, and FIG. 22D are explanatory graphs, each of which shows a relationship between the additional region and each of the existing region [j4−1] and the existing region [j4] when the variable j4 is smaller than the number tbl_size of the superimposition prohibition regions in the converted prohibition region table tbl2. FIG. 22A shows the ease where the relative start time drv2_lwr of the additional region is equal to or later than the relative end time tbl2_upr[j4−1] of the existing region [j4−1] and where the relative end time drv2_upr of the additional region is equal to or earlier than the relative start time tbl2_lwr[j4] of the existing region [j4]. FIG. 22B shows the case where the relative start time drv2_lwr of the additional region is earlier than the relative end time tbl2_upr[j4−1] of the existing region [j4−1] and where the relative end time drv2_upr of the additional region is equal to or earlier than the relative start time tbl2_lwr[j4] of the existing region [j4]. FIG. 22C shows the ease where the relative start time drv2_lwr of the additional region is equal to or later than the relative end time tbl2_upr[j4−1] of the existing region [j4−1] and where the relative end time drv2_upr of the additional region is later than the relative start time tbl2_upr[j4−1] of the existing region [j4]. FIG. 22D shows the case where the relative start time drv2_lwr of the additional region is earlier than the relative end time tbl2_upr[j4−1] of the existing region [j4−1] and where the relative end time drv2_upr of the additional region is later than the relative start time tbl2_lwr[j4] of the existing region [j4].

In the case of FIG. 22A, the additional region is superimposed on neither the existing region [j4−1] nor the existing region [j4]. In the case of FIG. 22B, the additional region is superimposed on the existing region [j4−1] but is not superimposed on the existing region [j4]. In the case of FIG. 22C, the additional region is not superimposed on the existing region [j4−1] but is superimposed on the existing region [j4]. In the case of FIG. 22D, the additional region is superimposed on both of the existing region [j4−1] and the existing region [j4]. It can be said that the processing in steps S430 and S440 is processing to determine which one of FIG. 22A to FIG. 22D the current situation corresponds to.

If the relative start time drv2_lwr of the additional region is equal to or later than the relative end time tbl2_upr[j4−1] of the existing region [j4−1] in step S420, and if the relative end time drv2_upr of the additional region is equal to or shorter than the relative start time tbl2_lwr[j4] of the existing region [j4] in step S430, such a case corresponds to FIG. 22A, and it is determined that the additional region is superimposed on neither the existing region [j4−1] nor the existing region [j4].

Then, the number tbl_size of the superimposition prohibition regions in the converted prohibition region table tbl2 is updated by adding 1 thereto (step S460). Thereafter, the variable j4 is compared to the value that is acquired by subtracting 1 from the updated number tbl_size of the superimposition prohibition regions (the number of the superimposition prohibition regions prior to the update) (step S470). The case where the variable j4 is smaller than the value that is acquired by subtracting 1 from the updated number tbl_size of the superimposition prohibition regions (the number of the superimposition prohibition regions prior to the update) is considered. Thus, as expressed by the formula (19), a variable k1 is set to a value that is acquired by subtracting 1 from the updated number tbl_size of the superimposition prohibition regions (step S430).

$$k1 \leftarrow tbl\_size - 1 \quad (19)$$

Next, as expressed by the formula (20) and the formula (21), relative start time tbl2_lwr[k1−1] and relative end time tbl2_upr[k1−1] of the superimposition prohibition region [k1−1] in the converted prohibition region table tbl2 are respectively set to relative start time tbl2_lwr[k1] and relative end time tbl2_upr[k1] of the superimposition prohibition region [k1] (step S490). Then, the variable k1 is updated by subtracting 1 therefrom (step S500), and the updated variable k1 is compared to the variable j4 (step S510). If the variable k1 is larger than the variable j4, the processing returns to step S490.

$$tbl2\_lwr[k1] \leftarrow tbl2\_lwr[k1-1] \quad (20)$$

$$tbl2\_upr[k1] \leftarrow tbl2\_upr[k1-1] \quad (21)$$

The processing from step S490 to step S510 is repeatedly executed until the variable k1 becomes equal to the variable j4 in step S510. In this way, the relative start time tbl2_lwr[tbl_size−1] to tbl2_lwr[j4+1] and the relative end time tbl2_upr[tbl_size−1] to tbl2_upr[j4+1] of the superimposition prohibition regions [tbl_size−1] to [j4+1] in the converted prohibition region table tbl2 are set in descending orders. Then, if the variable k1 is equal to the variable j4 in step S510, by the processing in step S520 described above, the relative start time tbl2_lwr[j4] and the relative end time tbl2_upr[j4] of the superimposition prohibition region [j4] in the converted prohibition region table tbl2 are set.

Figure 23:
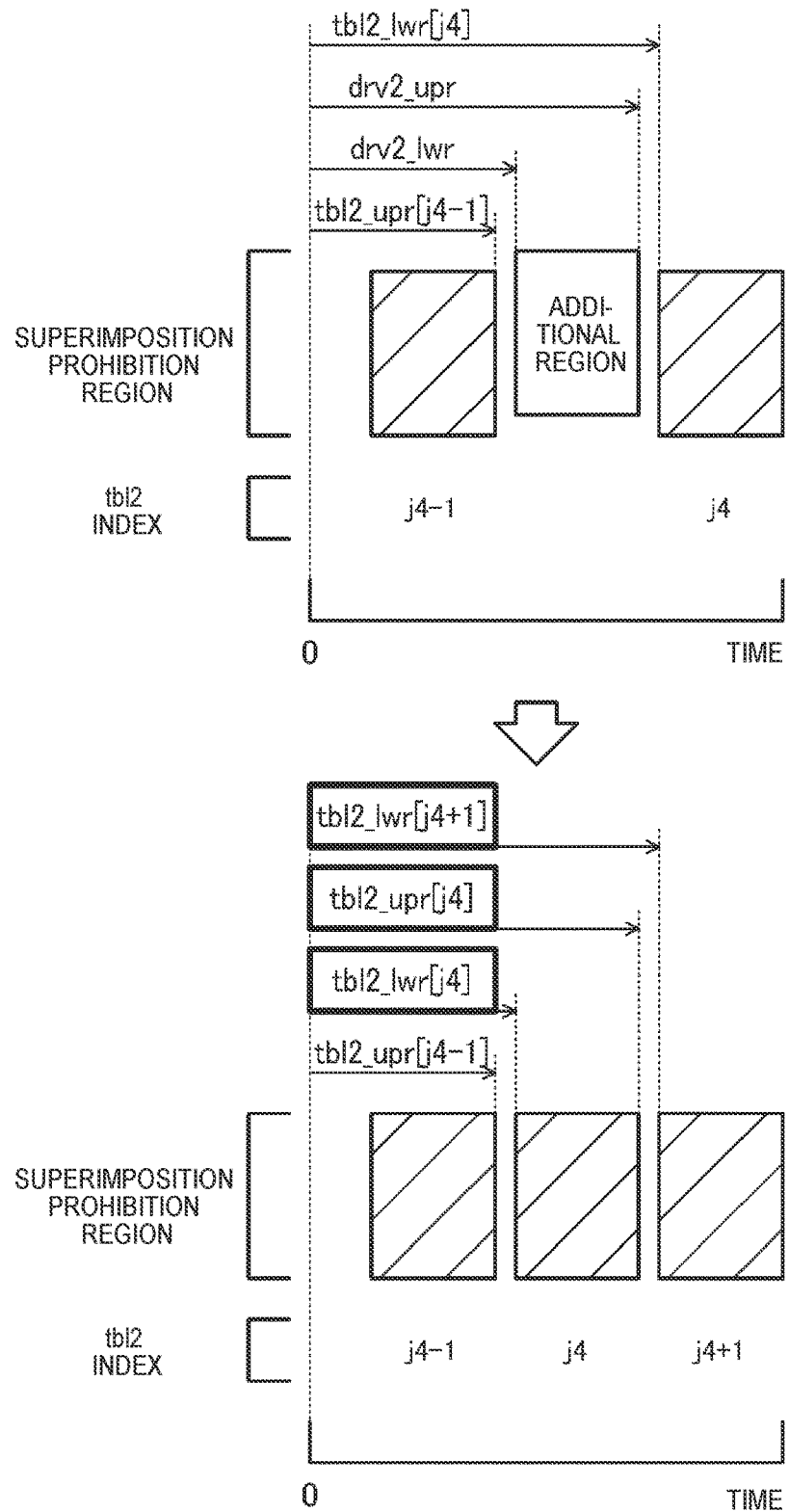
FIG. 23 includes explanatory graphs that show the updating state of the converted prohibition region table tbl2.
Figure 24:
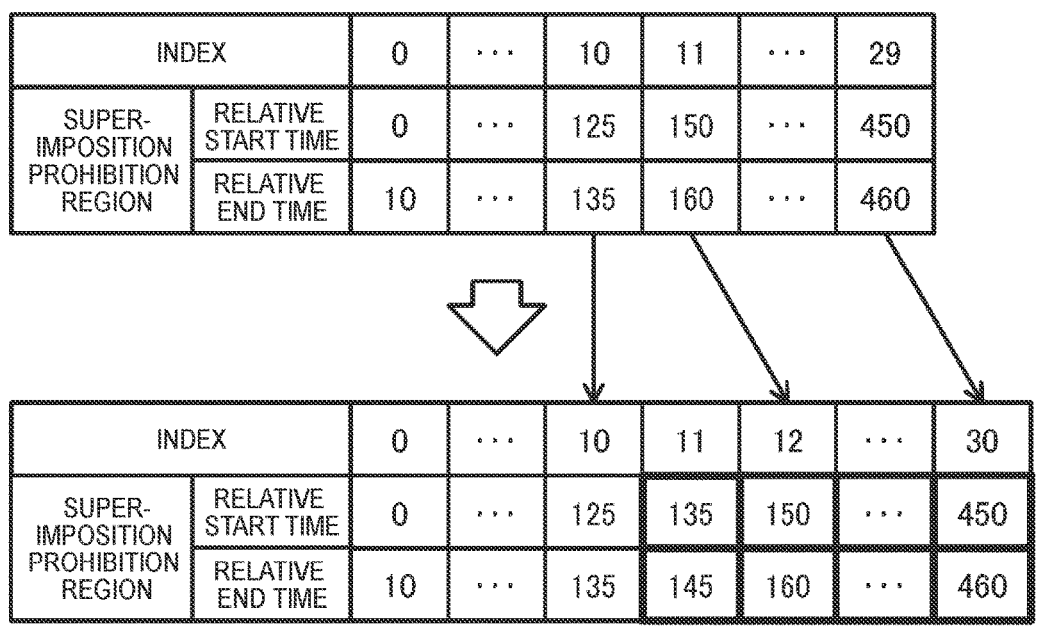
FIG. 24 includes explanatory tables that show the updating state of the converted prohibition region table tbl2.

FIG. 23 and FIG. 24 respectively include explanatory graphs and explanatory tables that show the updating state of the converted prohibition region table tbl2 in this case. Portions surrounded by bold lines in FIG. 23 and FIG. 24 are updated portions in the converted prohibition region table tbl2. In addition, FIG. 24 shows the case where the variable j4 is 11, the relative start time drv2_lwr and the relative end time drv2_upr of the additional region are respectively 135 and 145, and the number tbl_size of the superimposition prohibition regions in the converted prohibition region table tbl2 prior to the update (prior to the processing in step S460) is 30.

In these FIG. 23 and FIG. 24, the number tbl_size of the superimposition prohibition regions is updated by adding 1 thereto (see step S460). Next, the relative start time tbl2_lwr[tbl_size−2] to tbl2_lwr[j4] and the relative end time tbl2_upr[tbl_size−2] to tbl2_upr[j4] of the superimposition prohibition regions [tbl_size−2 (=29)] to [j4 (=11)] in the converted prohibition region table tbl2 are set to the relative start time tbl2_lwr[tbl_size−1] to tbl2_lwr[j4+1] and the relative end time tbl2_upr[tbl_size−1] to tbl2_upr[j4+1] of the superimposition prohibition regions [tbl_size−1(=30)] to [j4+1(=12)] in the descending orders (see steps S480 to S510). Then, the relative start time drv2_lwr (=135) and the relative end time drv2_upr (=145) of the additional region are set to the relative start time tbl2_lwr[j4] and the relative end time tbl2_upr[j4] of the superimposition prohibition region [j4(=11)] in the converted prohibition region table tbl2 (see step S520). That is, the converted prohibition region table tbl2 is updated by adding the additional region to the converted prohibition region table tbl2.

If the relative start time drv2_lwr of the additional region is earlier than the relative end time tbl2_upr[j4−1] of the existing region [j4−1] in step S420, and if the relative end time drv2_upr of the additional region is equal to or earlier than the relative start time tbl2_lwr[j4] of the existing region [j4] in step S440, such a case corresponds to FIG. 22B, and it is determined that the additional region is superimposed on the existing region [j4−1] but is not superimposed on the existing region [j4] (step S530). Then, by the processing in step S540 described above, the relative end time tbl2_upr [j4−1] of the existing region [j4−1] is set.

Figure 25:
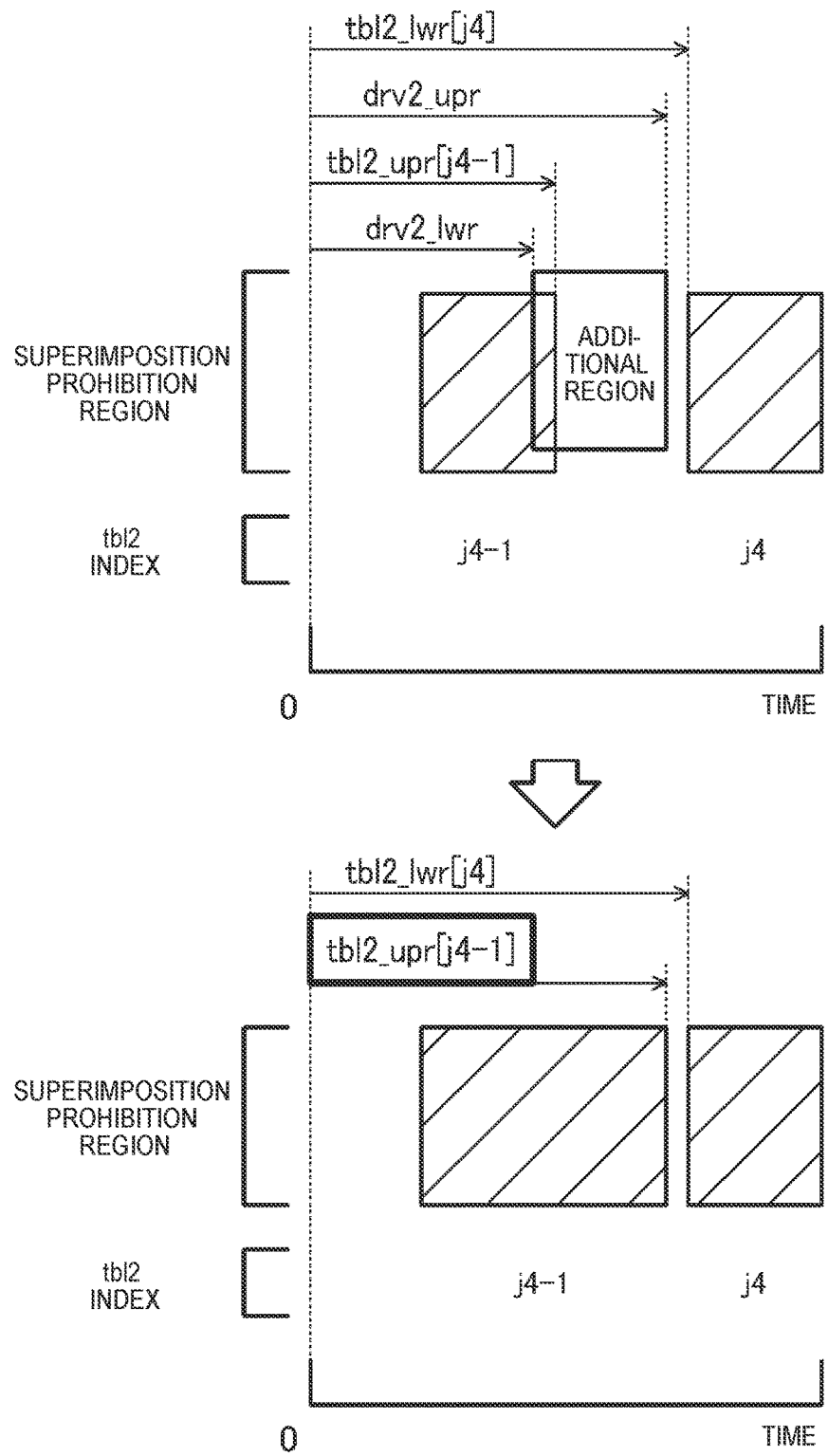
FIG. 25 includes explanatory graphs that show the updating state of the converted prohibition region table tbl2.
Figure 26:
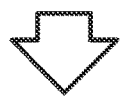
FIG. 26 includes explanatory tables that show the updating state of the converted prohibition region table tbl2.

FIG. 25 and FIG. 26 respectively include explanatory graphs and explanatory tables that show the updating state of the converted prohibition region table tbl2 in this case. Portions surrounded by bold lines in FIG. 25 and FIG. 26 are updated portions in the converted prohibition region table tbl2. In addition, FIG. 26 shows the case where the variable j4 is 11 and the relative end time drv2_upr of the additional region is 140. In these FIG. 25 and FIG. 26, the relative end time drv2_upr (=140) of the additional region is set to the relative end time tbl2_upr[j4−1] of the superimposition prohibition region [j4−1(=10)] in the converted prohibition region table tbl2 (see step S540). That is, the additional region and the existing region [j4−1] are combined and defined as the new superimposition prohibition region in the converted prohibition region table tbl2. In this way, the converted prohibition region table tbl2 is updated.

If the relative start time drv2_lwr of the additional region is equal to or later than the relative end time tbl2_upr[j4−1] of the existing region [j4−1] step S420, and if the relative end time drv2_upr of the additional region is later than the relative start time tbl2_lwr[j4] of the existing region [j4] in step S430, such a case corresponds to FIG. 22C, and it is determined that the additional region is not superimposed on the existing region [j4−1] but is superimposed on the existing region [j4]. Then, as expressed by the formula (22), the relative start time drv2_lwr of the additional region is set to the relative start time tbl2_lwr[j4] of the existing region [j4] (step S560).

$$tbl2\_lwr[j4] \leftarrow drv2\_lwr \quad (22)$$

Figure 27:
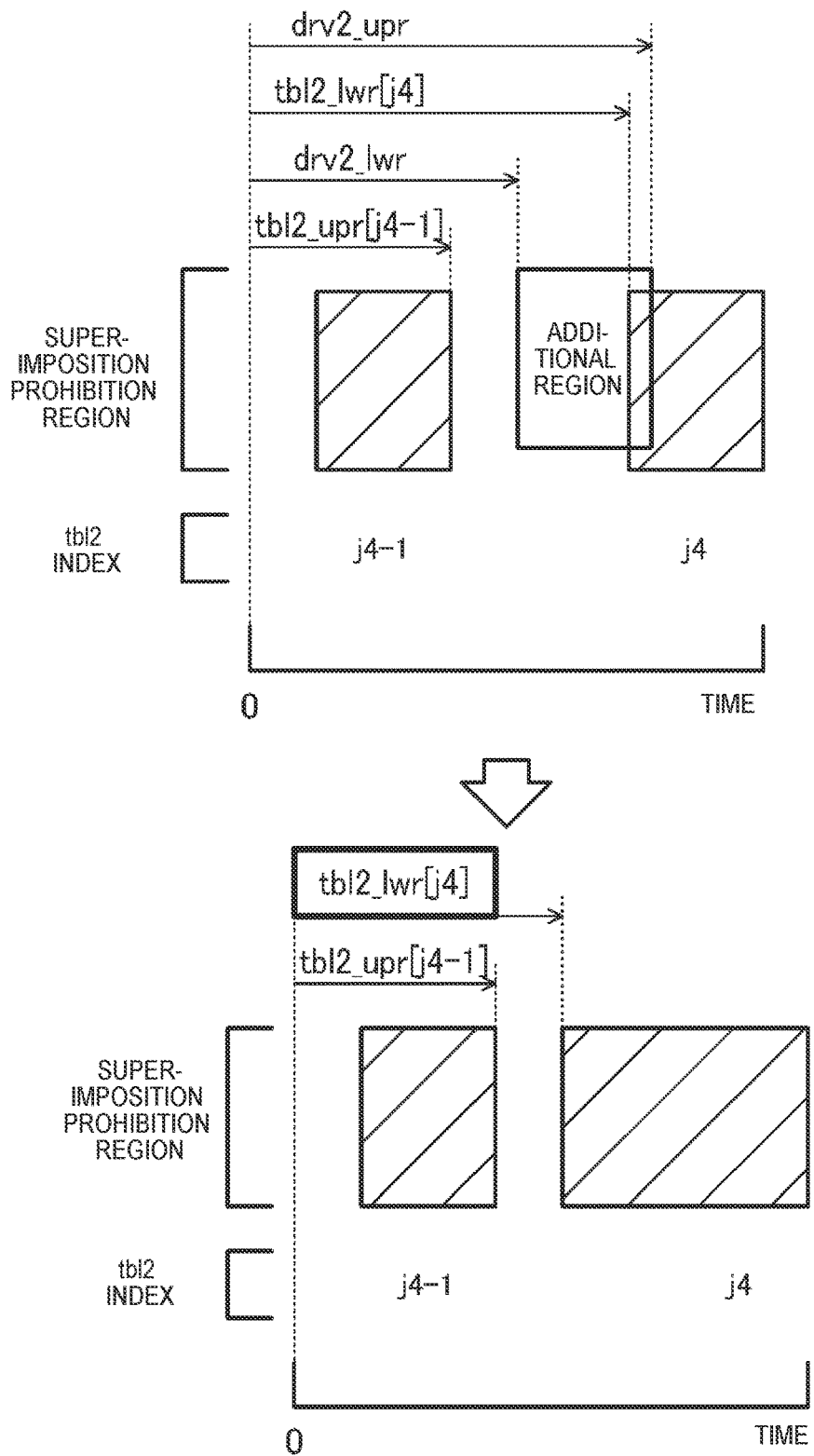
FIG. 27 includes explanatory graphs that show the updating state of the converted prohibition region table tbl2.
Figure 28:
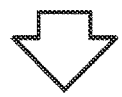
FIG. 28 includes explanatory tables that show the updating state of the converted prohibition region table tbl2.

FIG. 27 and FIG. 28 respectively include explanatory graphs and explanatory tables that show the updating state of the converted prohibition region table tbl2 in this case. Portions surrounded by bold lines in FIG. 27 and FIG. 28 are updated portions in the converted prohibition region table tbl2. In addition, FIG. 28 shows the case where the variable j4 is 11 and the relative start time drv2_lwr of the additional region is 145. In these FIG. 27 and FIG. 28, the relative start time drv2_lwr (=145) of the additional region is set to the relative start time tbl2_lwr[j4] of the superimposition prohibition region [j4(=11)] in the converted prohibition region table tbl2 (see step S560). That is, the additional region and the existing region [j4] are combined and defined as the new superimposition prohibition region in the converted prohibition region table tbl2. In this way, the converted prohibition region table tbl2 is updated.

If the relative start time drv2_lwr of the additional region is earlier than the relative end time tbl2_upr[j4−1] of the existing region [j4−1] in step S420, and if the relative end time drv2_upr of the additional region is later than the relative start time tbl2_lwr[j4] of the existing region [j4] in step S440, such a case corresponds to FIG. 22D, and it is determined that the additional region is superimposed on both of the existing region [j4−1] and the existing region [j4] (step S570). Next, as expressed by the formula (23), the relative end time tbl2_upr[j4] of the superimposition prohibition region [j4] in the converted prohibition region table tbl2 is set to the relative end time tbl2_upr[j4−1] of the superimposition prohibition region [j4−1] in the converted prohibition region table tbl2 (see step S580).

$$tbl2\_upr[j4-1] \leftarrow tbl2\_upr[j4] \quad (23)$$

Then, as expressed by the formula (24), the variable j4 is set to a variable k2 (step S590), and as expressed by the formula (25) and the formula (26), relative start time tbl2_lwr[k2+1] and relative end time tbl2_upr[k2+1] of the superimposition prohibition region [k2+1] in the converted prohibition region table tbl2 is set to relative start time tbl2_lwr[k2] and relative end time tbl2_upr[k2] of the superimposition prohibition region [k2] (step S600). Thereafter, the variable k2 is updated by adding 1 thereto (step S610), and the updated variable k2 is compared to a value (tbl_size−1) that is acquired by subtracting 1 from the number tbl_size of the superimposition prohibition regions in the converted prohibition region table tbl2 (step S620). If the variable k2 is smaller than the value (tbl_size−1), the processing returns to step S600.

$$k2 \leftarrow j4 \ (24), \ tbl2\_lwr[k2] \leftarrow tbl2\_lwr[k2+1] \quad (25)$$

$$tbl2\_upr[k2] \leftarrow tbl2\_upr[k2+1] \quad (26)$$

The processing from step S600 to step S620 is repeatedly executed until the variable k2 becomes equal to the value (tbl_size−1) in step S620. In this way, the relative start time tbl2_lwr[j4] to tbl2_lwr[tbl_size−2] and the relative end time tbl2_upr[j4] to tbl2_lwr[tbl_size−2] of the superimposition prohibition regions [j4] to [tbl_size−2] in the converted prohibition region table tbl2 are set in ascending orders. Then, if the variable k2 is equal to the value (tbl_size−1) in step S620, the number tbl_size of the superimposition prohibition regions in the converted prohibition region table tbl2 is updated by subtracting 1 therefrom (step S630).

Figure 29:
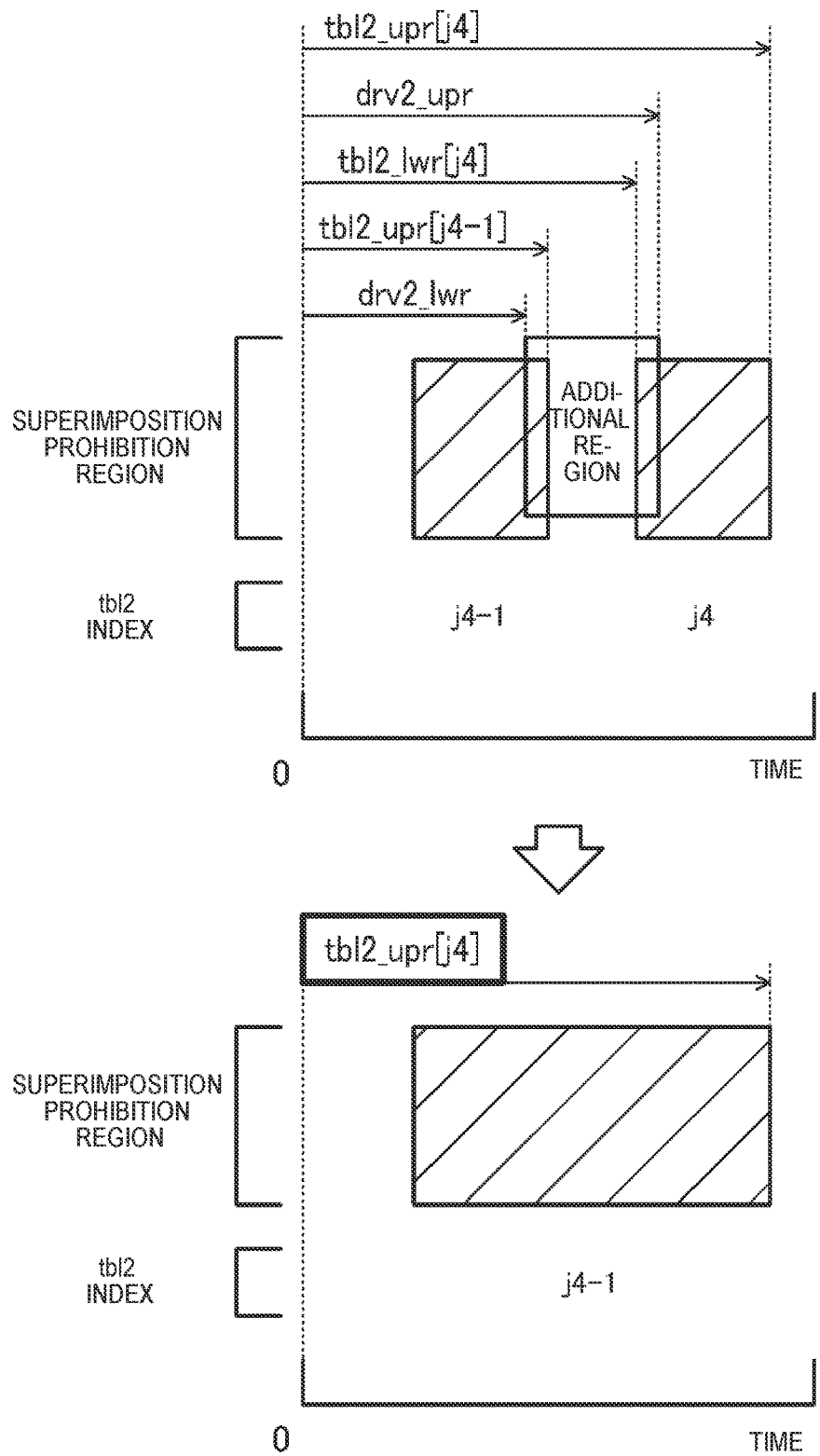
FIG. 29 includes explanatory graphs that show the updating state of the converted prohibition region table tbl2.
Figure 30:
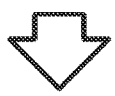
FIG. 30 includes explanatory tables that show the updating state of the converted prohibition region table tbl2.

FIG. 29 and FIG. 30 respectively include explanatory graphs and explanatory tables that show the updating state of the converted prohibition region table tbl2 in this case. Portions surrounded by bold lines in FIG. 29 and FIG. 30 are updated portions in the converted prohibition region table tbl2. In addition, FIG. 30 shows the case where the variable j4 is 11 and where the number tbl_size of the superimposition prohibition regions in the converted prohibition region table tbl2 is 30.

In these FIG. 29 and FIG. 30, the relative end time tbl2_upr[j4] of the superimposition prohibition region [j4 (=11)] in the converted prohibition region table tbl2 is set to the relative end time tbl2_upr[j4−1] of the superimposition prohibition region [j4−1 (=10)] (see step S580). Next, the relative start time tbl2_lwr[j4+1] to tbl2_lwr[tbl_size−1] and the relative end time tbl2_upr[j4+1] to tbl2_upr[tbl_size−1] of the superimposition prohibition regions [j4+1 (=12)] to [tbl_size−2(=29)] are set to the relative start time tbl2_lwr[j4] to tbl2_lwr[tbl_size−2] and the relative end time tbl2_upr[j4] to tbl2_upr[tbl_size−2] of the superimposition prohibition regions [j4(=11)] to [tbl_size−2 (=28)] in ascending orders (see steps S590 to S620). Thereafter, the number tbl_size of the superimposition prohibition regions in the converted prohibition region table tbl2 is updated by subtracting 1 therefrom (step S630). That is, the additional region, the existing region [j4−1], and the existing region [j4] are combined and defined as the new superimposition prohibition region in the converted prohibition region table tbl2. In this way, the converted prohibition region table tbl2 is updated.

The converted prohibition region table tbl2 is updated by the processing from step S460 to step S520, the processing in step S540, the processing in step S560, or the processing from step S550 to step S630. Thereafter, the variable i2 is updated by adding 1 thereto (step S640), and the updated variable i2 is compared to the number SIG_SIZE of the additional signals (step S650). The processing, in step S650 is processing to determine whether the processing to set the relative target time drv2b[0] to drv2b[SIG_SIZE−1] of all the additional signals [0] to [SIG_SIZE−1] and the updating processing of the converted prohibition region table tbl2 are completed.

If the variable i2 is smaller than the number SIG_SIZE of the additional signals, it is determined that these types of the processing are not completed for some of the additional signals [0] to [SIG_SIZE−1], and the processing returns to step S270. The processing from step S270 to step S650 is repeatedly executed until the variable i2 becomes equal to the number SIG_SIZE of the additional signals. If the variable i2 is equal to the number SIG_SIZE of the additional signals in step S650, it is determined that these types of the processing are completed for all the additional signals [0] to [SIG_SIZE−1].

Figure 31:
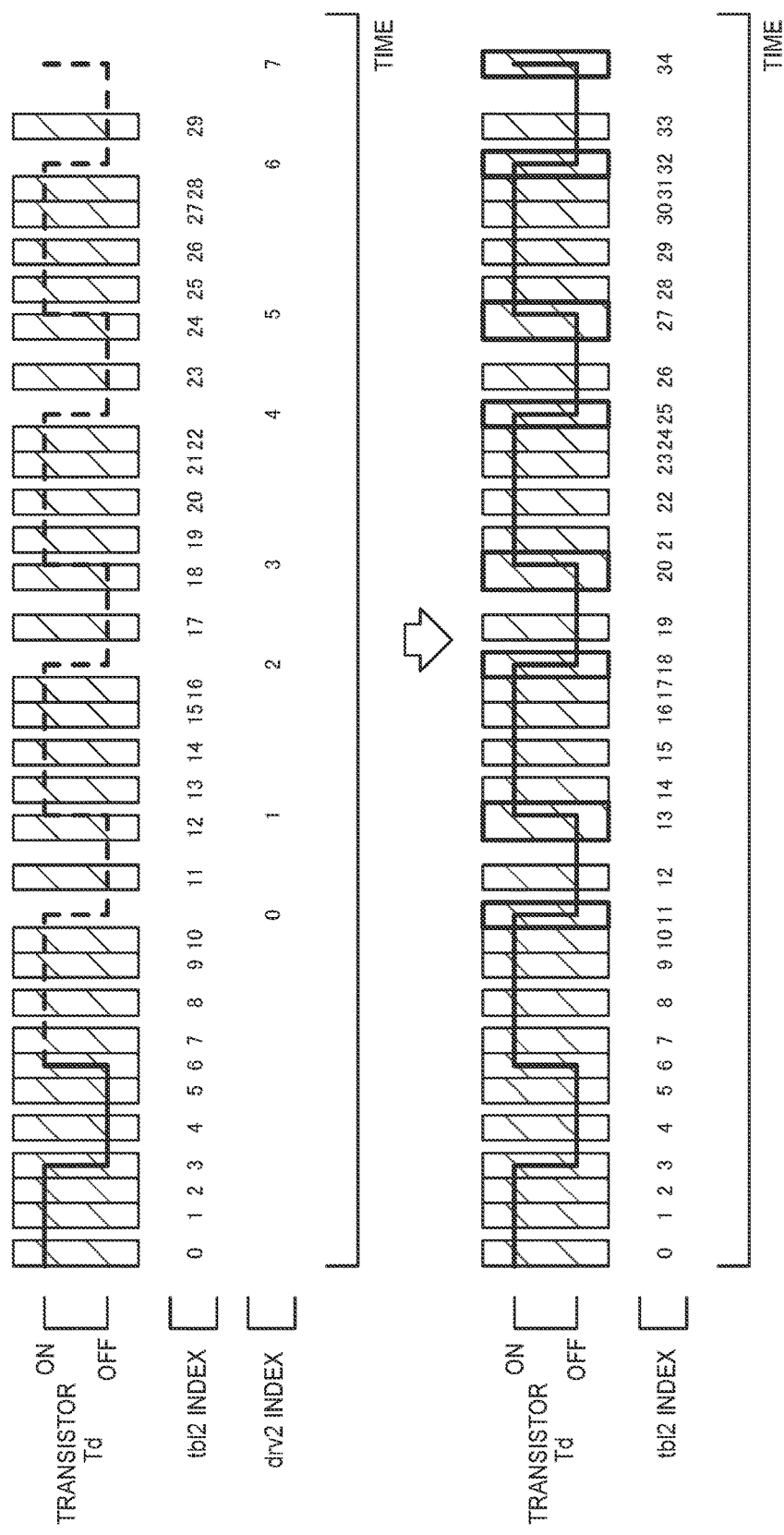
FIG. 31 shows a specific example of FIG. 8 to FIG. 11 and includes explanatory graphs that show a state when setting processing of relative target time drv2b[0] to drv2b[7] of additional signals [0] to [7] of the boost converter 40d and updating processing of the converted prohibition region table tbl2 are executed.
Figure 32:
FIG. 32 shows the specific example FIG. 8 to FIG. 11 and includes explanatory tables that show tine state. When the setting processing of the relative target time drv2b[0] to drv2b[7] of the additional signals [0] to [7] of the boost converter 40d and the updating processing of the converted prohibition region table tbl2 executed.

FIG. 31 and FIG. 32 show a specific example of FIG. 8 to FIG. 11 and are respectively explanatory graphs and explanatory tables that show a state where the processing to set the relative target time drv2b[0] to drv2b[7] of the additional signals [0] to [7] of the boost converter 40d and the updating processing of the converted prohibition region table tbl2 are executed. Portions surrounded by bold lines in FIG. 31 and FIG. 32 are substantially changed portions (newly added portions, portions whose relative start time or relative end time are changed, that is, changed portions, to which changes are made in addition to changes in, the number (INDEX)) of the superimposition prohibition regions. As it is apparent from FIG. 31 and FIG. 32, in the case where the updating processing of the converted prohibition region table tbl2 is executed in the specific example shown in FIG. 8 to FIG. 11, the start time and/or the end time of each of the superimposition prohibition regions [11], [13], [18], [20], [25], [27], [32], [34] in the converted prohibition region table tbl2 is substantially changed, and the number tbl_size of the superimposition prohibition regions in the converted prohibition region table tbl2 becomes 35.

Next, the converted prohibition region table tbl2 is reflected to the prohibition region table tbl (step S660 to S690). In reflection processing to the prohibition region table tbl, initially, variables j5, j6 are set (step S660). In the processing in step S460, the variable j5 is set to a value 0, and the variable j6 is set to a value that is calculated from the formula (27) by using the variable j5 as well as the start point i_st and the number BUFF_SIZE of the superimposition prohibition region in the prohibition region table tbl.

$$j6 \leftarrow \mathrm{mod}((i\_st+j5), \mathrm{BUFF\_SIZE}) \qquad (27)$$

Next, start time tbl_lwr[j6] and end time tbl_upr[j6] of the superimposition prohibition region [j6] in the prohibition region table tbl are set to values that are calculated from the formula (28) and the formula (29) by using relative start time tbl_lwr[j5] and relative end time tbl_upr[j5] of the superimposition prohibition region [j5] in the converted prohibition region table tbl2, the start time tbl_lwr[i_st] of the superimposition prohibition region [i_st] in the prohibition region table tbl, and the maximum timer value TIMER_MAX.

$$tabl\_lwr[j6] \leftarrow \mathrm{mod}((tbl2\_lwr[j5]+tbl\_lwr[i\_st]+\mathrm{TIMER\_MAX}), \mathrm{TIMER\_MAX}) \qquad (28)$$

$$tabl\_upr[j6] \leftarrow \mathrm{mod}((tbl2\_upr[j5]+tbl\_lwr[i\_st]+\mathrm{TIMER\_MAX}), \mathrm{TIMER\_MAX}) \qquad (29)$$

Then, the variable j5 is updated by adding 1 thereto, and the variable j6 is updated by the above-described formula (27) (step S680). Thereafter, the updated variable j5 is compared to the number tbl_size of the superimposition prohibition regions in the converted prohibition region table tbl2 (step S690). If the variable j5 is smaller than the number tbl_size of the superimposition prohibition regions, the processing returns to step S670.

The processing from step S670 to step S690 is repeatedly executed until the variable j5 becomes equal to the number tbl_size of the superimposition prohibition regions in step S690. In this way, the start time tbl_lwr[i_st] to tbl_lwr[i_st+tbl_size−1] and the end time tbl_upr[i_st] to tbl_upr[i_st+tbl_size−1] of the superimposition prohibition regions [i_st] to [i_st+tbl_size−1] in the prohibition region table tbl are set (updated). If the variable j5 is equal to the number tbl_size of the superimposition prohibition regions in step S690, the reflection processing to the prohibition region table tbl is terminated.

Figure 33:
FIG. 33 includes explanatory tables of reflection processing to an output table drv3.

Next, the converted additional signal table drv2 is reflected to an output table drv3 (steps S700 to S730). FIG. 33 includes explanatory tables of the reflection processing to the output table drv3. An upper portion of FIG. 33 is an explanatory table of an example of the converted additional signal table drv2 (the same as FIG. 11), and a lower portion of FIG. 33 is an explanatory table of an example of the output table drv3. In the upper portion of FIG. 33, "INDEX" includes numbers that are assigned to the additional signals in the output table drv3.

The output table drv3 defines the target time (the target timing) of each of the additional signals of switching of the transistors Ta to Td in the boost converters 40a to 40d, and is created for each of the boost converters 40a to 40d. That is, in the embodiment, the four output tables drv3 are created. The CPU 52 of the electronic control unit 50 switches the transistors Ta to Td in the boost converters 40a to 40d in accordance with the target time of each of the additional signals in the output tables drv3 for the boost converters.

In reflection processing to the output table drv3, initially, a variable i3 is set to 0 (step S700). Next, target time drv3[i3+i4+1] of the additional signal [i3+i4+1] in the output table drv3 is set to a value that is calculated from the formula (30) using relative target time drv2b[i3] of the additional signal [i3] in the converted, additional signal table drv2, the start time tbl_lwr[i_st] of the superimposition prohibition region [i_st] in the prohibition region table tbl, and the maximum timer value TIMER_MAX (step S720). Here, the value i4 is the last end point in the converted, additional signal table drv2. That is, the converted additional signal table drv2 defines up to the target time drv3[i4] of the additional signal [i4] of the target boost converter before the reflection processing to the output table drv3 is initiated.

drv3[i3+i4+1]←mod((drv2b[i3]−tbl_lwr[i_st]+TIMER_MAX), TIMER_MAX)    (30)

Then, the variable i3 is updated by adding 1 thereto (step S720). Thereafter, the updated variable i3 is compared to the number SIG_SIZE of the additional signals (step S730). If the variable i3 is smaller than the number SIG_SIZE of the additional signals, the processing returns to step S700.

The processing from step S700 to step S730 is repeatedly executed until the variable i3 becomes equal to the number SIG_SIZE of the additional signals in step S730. In this way, the target time drv3[i4+1] to drv3[i4+SIG_SIZE] of the additional signals [i4+1] to [i4+SIG_SIZE] in the output table drv3 are set. If the variable i3 is equal to the number SIG_SIZE of the additional signals in step S730, the reflection processing to the output table drv3 is terminated.

In the embodiment, as described in above-described steps S280 to S380, the relative target time of each of the additional signals of the target boost converter can be set in the manner not to be superimposed on the existing superimposition prohibition regions (the superimposition prohibition regions that are based on the additional signals of the boost converters other than the target boost converter) in the converted prohibition region table tbl2. Thus, it can be said that the target time of each of the additional signals of the target boost converter can be set in the manner not to be superimposed on the existing superimposition prohibition regions in the prohibition region table tbl.

Similar to FIG. 9, FIG. 33 shows the case where the start point i_st in the prohibition region table tbl is 110 and where the start time tbl_lwr[110] of the superimposition prohibition region [110] is 65195. In this FIG. 33, the target time drv3[i4+1] of the additional signal [i4+1] in the output table drv3 is set to a value that is calculated from the above-described formula (30) by using the relative target time drv2b[0](=140) of the additional signal [0] in the converted additional signal table drv2, the start time tbl_lwr[110] (=65195) of the superimposition prohibition region [110] in the prohibition region table tbl, and the maximum timer value TIMER_MAX (=65535), that is, 65335. Similarly, the target time drv3[i3+i4+1] of the additional signal [i3+i4+1] in the output table drv3 is set to a value that is calculated from the formula (30) by using the relative target time drv2b[i3+i4+1] of the additional signals [i3 (i3: 1 to 7) +i4+1] in the converted additional signal table drv2 and the start time tbl_lwr[110].

Next, the start point i_st and the end point i_end in the prohibition region table tbl are updated (step S740), and the current routine is terminated. In the processing in step S740, the value that is calculated from the formula (31) by using the current start point i_st in the prohibition region table tbl, the number tbl_size of the superimposition prohibition regions in the converted prohibition region table tbl2, and the number BUFF_SIZE of the superimposition prohibition region in the prohibition region table tbl is set as the new end point i_end in the prohibition region table tbl. In addition, a value that is calculated from the formula (32) by using the updated end point i_end, the initial value TBL_SIZE_INI of the number of the superimposition prohibition regions in the prohibition region table tbl2, and the number BUFF_SIZE of the superimposition prohibition region in the prohibition region table tbl is set as the new start point i_st in the prohibition region table tbl. The thus-updated start point i_st and end point i_end are used when the current routine is executed next time.

i_end←mod(i_st+tbl_size−1, BUFF_SIZE)    (31)

i_st←mod((i_end+1−TBL_SIZE_INI+BUFF_SIZE), BUFF_SIZE)    (32)

In the specific example shown in FIG. 8 to FIG. 11, the updating processing of the converted prohibition region table tbl2 is executed. As shown in FIG. 31 and FIG. 32, when the number tbl_size of the superimposition prohibition regions in the converted prohibition region table tbl2 becomes 35, the end point i_end in the prohibition region table tbl becomes 16 by the formula (33), and the start point i_st becomes 115 by the formula (34).

i_end←mod(110+35−1, 128)=16    (33)

i_st←mod(16+1−30+128), 128)=115    (34)

In the boost converter apparatus mounted on the electric vehicle 20 in the embodiment that has been described so far, the CPU 52 of the electronic control unit 50 switches the transistors Ta to Td in the boost converters 40a to 40d in accordance with the each target time (the each target timing). In addition, the RAM 56 of the electronic control unit 50 stores the prohibition region, table tbl. For each of the boost converters 40a to 40d, the CPU 52 sets the relative target time in the manner not to be superimposed on any of the superimposition prohibition regions in the converted prohibition region table tbl2, which created from the prohibition region table tbl, updates the converted prohibition region table tbl2 by using the superimposition prohibition regions (the additional regions) based on the relative target time, reflects the converted prohibition region table tbl2 to the prohibition region table tbl, and sets the target time on the basis of the relative target time. With such control, it is possible to avoid the superimposition of the timing of switching of the transistors Ta to Td in the boost converters 40a to 40d on each other by using the prohibition region table tbl and the converted prohibition region table tbl2. As a result, it is possible to suppress an increase in the voltage surge of the high-voltage side power line 44 and the voltage VH of the high-voltage side power line 44 from exceeding the withstand voltage of the capacitor 48 and the like.

As described in the processing in step S350 to step S380 of the processing routine shown in FIG. 2 to FIG. 6 with reference to FIG. 14A to FIG. 16, the boost converter apparatus mounted on the electric vehicle 20 in the embodiment is configured as follows. In the case where the relative requested time drv2a[i2] of the additional signal [i2] is superimposed on the front-half portion of the superimposition prohibition region [j4], the relative target time drv2b[i2] of the additional signal [i2] is set to the relative start time tbl2_lwr[j4] of the superimposition prohibition region [j4]. In the case where the relative requested time drv2a[i2] of the additional signal [i2] is superimposed on the latter-half portion of the superimposition prohibition region [j4], the relative target time drv2b[i2] of the additional signal [i2] is set to the relative end time tbl2_upr[j4] of the superimposition prohibition region [j4]. However, the relative target time drv2b[i2] of the additional signal [i2] may be set to the relative start time tbl2_lwr[j4] of the superimposition prohibition region [j4] regardless of whether the relative requested time drv2a[i2] of the additional signal [i2] is superimposed on the front-half portion or the latter-half portion of the superimposition prohibition region [j4]. In addition, the relative target time drv2b[i2] of the additional signal [i2] may be set to the relative end time tbl2_upr[j4] of the superimposition prohibition region regardless of whether the relative requested time drv2a[i2] of the additional signal [i2] is superimposed on the front-half portion or the latter-half portion of the superimposition prohibition region [j4].

As described in the processing in step S540, the processing in step S560, and the processing in step S580 to S630 of the processing routine shown in FIG. 2 to FIG. 6, the boost converter apparatus mounted on the electric vehicle 20 of the embodiment is configured as follows. In the case where the additional, region is superimposed only on the existing region [j4−1] (the existing region on the front side), the additional region and the existing region [j4−1] are combined and defined as the new superimposition prohibition region in the converted prohibition region table tbl2. In the case where the additional region is superimposed only on the existing region [j4] (the existing region on the back side), the additional region and the existing region [j4] are combined and defined as the new superimposition prohibition region in the converted prohibition region table tbl2. In the case where the additional region is superimposed on the existing region [j4−1] and the existing region [j4], the additional region, the existing region [j4−1] and the existing region [j4] are combined and defined as the new superimposition prohibition region in the converted prohibition region table tbl2. However, in each of these cases, the additional region may not be combined with the existing region [j4−1] and/or the existing region [j4], but the additional region may be added to the converted prohibition region table tbl2.

In the boost converter apparatus mounted on the electric vehicle 20 of the embodiment, the converted prohibition region table tbl2 is created from the prohibition region table tbl, the converted additional signal table drv2 is created from the additional signal table drv, the superimposition prohibition region (the additional region) is set on the basis of the additional signal in the converted additional signal table drv2, the converted prohibition region table tbl2 is updated by using this superimposition prohibition region (this additional region), and the updated converted prohibition region table tbl2 is reflected to the prohibition region table tbl. However, the converted prohibition region table tbl2 or the converted additional signal table drv2 may not be created. In this case, the superimposition prohibition region (the additional region) may be set on the basis of the additional signal in the additional signal table drv, and the prohibition region table tbl may be updated by using this superimposition prohibition region (this additional region).

In the boost converter apparatus mounted on the electric vehicle 20 of the embodiment, the boost converter 40*a* includes the reactor La, the diode Da, and the transistor Ta. However, in addition to these components, the boost converter 40*a* may include: a transistor that is connected in parallel with the diode Da; a diode that is connected in parallel with the transistor Ta such that a direction from the negative-electrode side lines of the low-voltage side power line 42 and the high-voltage side power line 44 to a connection point side of the reactor La and the diode Da is set as the forward direction. The same applies to the boost converters 40*b* to 40*d*. In this case, each of the boost converters 40*a* to 40*d* can boost the voltage of the power of the low-voltage side power line 42 and supply such power to the high-voltage side power line 44. In addition, each of the boost converters 40*a* to 40*d* can lower the voltage of the power of the high-voltage side power line 44 and supply such power to the low-voltage side power line 42.

In the boost converter apparatus mounted on the electric vehicle 20 of the embodiment, the four boost converters 40*a* to 40*d* are connected in parallel with each other to the low-voltage side power line 42 and the high-voltage side power line 44. However, the number of the boost converters may be two, three, five, or more.

In the embodiment, an aspect of the boost converter apparatus mounted on the electric vehicle 20 that includes the motor 32 is adopted. However, an aspect of the boost converter apparatus mounted on a hybrid vehicle that includes an engine in addition to the motor 32 may be adopted. An aspect of the boost converter apparatus mounted on a movable body such as a vehicle other than the automobile, a water craft, or an aircraft may be adopted. Furthermore, an aspect of the boost converter apparatus installed in an unmovable facility such as a construction facility may be adopted.

In the embodiment, the boost converters 40*a* to 40*d* are an example of the "plurality of boost converters", and the electronic control unit 50 having the CPU 52 and the RAM 56 is an example of the "electronic control unit".

The mode for carrying out the disclosure has been described so far by using the embodiment. However, the disclosure is not limited to such an embodiment in any respect. Needless to say, the disclosure can be implemented in various modes within the scope that does not depart from the gist of the disclosure.

The disclosure can be used in a boost converter apparatus manufacturing industry and the like.

What is claimed is:

1. A boost converter apparatus comprising:
 a plurality of boost converters connected in parallel with each other to a power supply side and an electrical load side, the plurality of boost converters being configured to boost a voltage of power on the power supply side by switching a switching element and to supply the power to the electrical load side; and
 an electronic control unit configured to switch the switching element of each of the plurality of boost converters in accordance with each target timing,
  the electronic control unit being configured to store a table in which a plurality of superimposition prohibition regions are defined, and the electronic control unit being configured to set the target timing for each of the plurality of boost converters in a manner not to be superimposed on any of the plurality of superimposition prohibition regions defined in the table, and to update the table by using a superimposition prohibition region based on the target timing.

2. The boost converter apparatus according to claim 1, wherein the electronic control unit is configured to set requested timing of switching of the switching element in each of the plurality of boost converters, the electronic control unit is configured to set the requested timing as the target timing when the requested timing is superimposed on none of the plurality of superimposition prohibition regions defined in the table, and the electronic control unit is configured to set the target timing by putting the requested timing ahead or behind the superimposition prohibition region on which the requested timing is superimposed when the requested timing is superimposed on any of the plurality of superimposition prohibition regions defined in the table.

3. The boost converter apparatus according to claim 2, wherein the electronic control unit is configured to set the target timing to start time of the superimposition prohibition region on which the requested timing is superimposed when the requested timing is superimposed on a front-half portion of any of the plurality of superimposition prohibition regions defined in the table, and the electronic control unit is configured to set the target timing to end time of the superimposition prohibition region on which the requested timing is superimposed when the requested timing is superimposed on a latter-half portion of any of the plurality of superimposition prohibition regions defined in the table.

4. The boost converter apparatus according to claim 1, wherein the superimposition prohibition region is a region that has a specified period with the target timing being a center.

5. The boost converter apparatus according to claim 1, wherein the electronic control unit is configured to define the superimposition prohibition region based on the target timing in the table when the superimposition prohibition region based on the target timing is superimposed on none of the plurality of superimposition prohibition regions defined in the table, and the electronic control unit is configured to define new superimposition prohibition region in the table when the superimposition prohibition region based on the target timing is superimposed on any of the plurality of superimposition prohibition regions defined in the table, the new superimposition prohibition region is a region that combines the superimposition prohibition region based on the target timing and the superimposition prohibition region on which the superimposition prohibition region based on the target timing is superimposed.

* * * * *

UNITED STATES PATENT AND TRADEMARK OFFICE
CERTIFICATE OF CORRECTION

PATENT NO. : 10,404,174 B2
APPLICATION NO. : 16/269297
DATED : September 3, 2019
INVENTOR(S) : Masaharu Kimura It is certified that error appears in the above-identified patent and that said Letters Patent is hereby corrected as shown below:

In the Specification

In Column 1, Line 7, delete "tiled" and insert --filed--, therefor.

In Column 3, Line 19, delete "old" and insert --of--, therefor.

In Column 3, Line 20, delete "that s" and insert --that is--, therefor.

In Column 3, Line 30, delete "off" and insert --of a--, therefor.

In Column 4, Line 61, delete "tine" and insert --the--, therefor.

In Column 5, Line 19, delete "he" and insert --the--, therefor.

In Column 9, Line 4, delete "-3α to +α" and insert -- -3α to -α--, therefor.

In Column 9, Line 38, delete "(step S160) (step S160)" and insert --(step S160)--, therefor.

In Column 11, Line 26, delete "tinier" and insert --timer--, therefor.

In Column 11, Line 54, after "value that" delete "no", therefor.

In Column 14, Line 21, delete "tune" and insert --time--, therefor.

In Column 16, Line 20, delete "additions" and insert --additional--, therefor.

In Column 16, Line 50 - 52, delete "[illegible equations (16) and (17)]"

Signed and Sealed this
Twenty-sixth Day of November, 2019

Andrei Iancu
*Director of the United States Patent and Trademark Office* and insert --
$$tbl2\_lwr[j4] \leftarrow drv2\_lwr \quad \ldots(16)$$
$$tbl2\_upr[j4] \leftarrow drv2\_upr \quad \ldots(17)$$
--, therefor.

In Column 16, Line 60, delete "drv2upr" and insert --drv2_upr--, therefor.

In Column 17, Line 3, delete "tbl2lwr[j4]" and insert --tbl2_lwr[j4]--, therefor.

In Column 18, Line 4, delete "tb12_upr[j4-1]" and insert --tbl2_lwr[j4]--, therefor.

In Column 18, Line 46, delete "(step S430)" and insert --(step S480)--, therefor.

In Column 21, Line 44, delete "S550" and insert --S580--, therefor.

In Column 22, Line 22, delete "S460" and insert --S660--, therefor.

In Column 23, Line 47, delete "S380." and insert --S380,--, therefor.